United States Patent [19]
Iriuchijima et al.

[11] Patent Number: 6,070,006
[45] Date of Patent: May 30, 2000

[54] OBJECT ORIENTED SOFTWARE DEVELOPMENT TOOL FOR CREATION OF NEW CLASS(ES)

[75] Inventors: Hiroko Iriuchijima, Kawasaki; Akihiro Yamashiro, Yokohama, both of Japan

[73] Assignee: Kabushiki Kaisha Toshiba, Kawasaki, Japan

[21] Appl. No.: 08/780,459

[22] Filed: Jan. 8, 1997

Related U.S. Application Data

[63] Continuation of application No. 08/227,235, Apr. 13, 1994, abandoned.

[30] Foreign Application Priority Data

Apr. 14, 1993 [JP] Japan .................................. 5-087265

[51] Int. Cl.⁷ ...................................................... G06F 9/44
[52] U.S. Cl. .......................... 395/701; 395/702; 395/703; 395/707; 395/708
[58] Field of Search ................................... 395/702, 700, 395/701, 703, 707, 708

[56] References Cited

U.S. PATENT DOCUMENTS

| | | | |
|---|---|---|---|
| 5,339,433 | 8/1994 | Frid-Nielsen | 395/700 |
| 5,404,525 | 4/1995 | Endicott et al. | 395/700 |
| 5,493,680 | 2/1996 | Danforth | 395/702 |
| 5,499,371 | 3/1996 | Henninger et al. | 395/702 |
| 5,642,511 | 6/1997 | Chow et al. | 395/701 |
| 5,692,195 | 11/1997 | Conner et al. | 395/685 |
| 5,699,310 | 12/1997 | Garloff et al. | 395/701 |
| 5,732,271 | 3/1998 | Berry et al. | 395/683 |
| 5,740,440 | 4/1998 | West | 395/704 |
| 5,758,160 | 5/1998 | McInerney et al. | 395/701 |
| 5,845,119 | 12/1998 | Kozuka et al. | 395/702 |
| 5,862,379 | 1/1999 | Rubin et al. | 395/702 |
| 5,896,532 | 4/1999 | Blewett | 395/701 |

OTHER PUBLICATIONS

Object–Oriented Modeling and Design, Rumbaugh et al. Chapters 1,3,4,15,18 and pp. 1,9,10,242–247, Nov. 1990.

Beethe, D et al, "A Visual Engineering Environment for Test Software Development", Hewlett–Packard Journal Oct. 1992 vol. 43 No. 5 p.72(6).

Lejter, M. et al, "Support for Maintaining Object–Oriented Programs", IEEE Transactions On Software Engineering, vol. 18, No. 12, Dec. 1992, pp. 1045–1052.

Petzold, C., "The Visual Development Environment More than Just a Pretty Face", PC Magazine, Jun. 16, 1992, pp. 195–200, 204, 206, 209, 210, 215, 216, 221, 222, 224, 225–227, 232, 234, 236, 237.

Wolf, A., "SynchsoWorks Makes Sense of Visual Object Programming", Distributed Computing Monitor Jul. 1992 vol. 7, No. 7 p. 31(4).

Canter, S. "Object–oriented Programming", PC Magazine, Jul. 1992 vol. 11, No. 13 p. 374(1).

*Primary Examiner*—Robert W. Downs
*Assistant Examiner*—Todd Ingberg
*Attorney, Agent, or Firm*—Oblon, Spivak, McClelland, Maier & Neustadt, P.C.

[57] ABSTRACT

An object-oriented programming system which performs equivalent conversion on a class network structure.

Program data including class data and relation data in entered from the class data input section (4) and the relation data input section (5). Program data is stored in the class data file (6) and relation data file (7). The range of equivalent conversion is entered from the conversion range input section (8), and an equivalent conversion mode is entered from the conversion mode input section (9). The equivalent conversion section (10) converts the program data based on the range and the mode. The output range of program data is entered from the display range input section (12), and the output format of program data is entered from the display format input section (13). The generation section (11) generates the display data of the program data in the diagram format. The display unit (2) displays the diagram of the display data.

21 Claims, 29 Drawing Sheets

OBJECT ORIENTED SOFTWARE DEVELOPMENT TOOL FOR CREATION OF NEW CLASS(ES)

This application is a Continuation of application Ser. No. 08/227,235, filed on Apr. 13, 1994, now abandoned.

BACKGROUND OF THE INVENTION

The present invention relates to the improvement of object-oriented programming system that supports both object-oriented design and programming. The invention relates especially to the equivalent conversion of class network structure of a program.

Recently, object-oriented programming languages such as C++ have become popular as software development tools. In object-oriented programming, real world objects are represented by software entities called "objects" (also called "instances"); and states and behaviors of real world objects are defined as "attributes" and "operations" of "objects" respectively.

Object-oriented programming enables, on a software basis, real world information to be modeled, thus allowing simply-structured, easy-to-maintain software to be implemented.

In object-oriented programming, a program is composed of both classes and relationships among classes.

An object, described above, is created by a class as a result of program execution. During execution, actual values are assigned to the attributes of the object. This means that each class is a prototype of an object and that all objects which have the same attributes and operations are defined in a single class. In actual programming work, classes and relations among classes are described according to the specific grammar of a programming language.

The relationship among classes in object-oriented programming are typically inheritance, aggregation and association. "Inheritance" is a relationship which enables one class (a child class) to inherit the attributes and operations defined by another class (a parent class) without having to describe them again. This relationship, which is specified by a pre-defined format, defines the network structure of the whole program. When a parent class in an inheritance hierarchy has a certain relationship with a certain class, its child class is considered to have the same relationship with the certain class. This means that inheritance allows different structures which denote equal contents to be represented. Thus Inheritance lets the user omit the description of the definition, ensuring the child class has the same contents. On the other hand, when attributes or operations defined in a parent class change, child classes of this parent class inherit the changed attributes and operations, and the change affects not only to the parent class but also the child classes.

"Aggregation" is a relationship which allows one class (whole class) to include another class (part class) as its own part. This relationship, which is also specified in a pre-defined format, allows the user to develop programs incrementally and to use classes as if they were modules contained in a library.

"Association" is different from inheritance and aggregation. Association is a general relationship which denotes that there exists some communication between classes. Classes are linked by relationships to form a class network structure, and this structure, in turn, forms the whole program.

An existing object-oriented programming system supports the development of object-oriented programming. This system provides the user with various functionalities necessary for object-oriented programming; for example, it generates diagrams (charts) showing program elements and class network structures. With this system, the user can increase efficiency and reliability of object-oriented programming.

However, prior object-oriented programming systems do not provide the user with a means to modify class network structures (cancel and generate some relations) and each element of the class data (add and delete attributes, operations, and/or the class itself) while keeping the same information. Because of this, the prior systems have the following problems:

(1) First, when a change in one class affects other classes through class relationships, it is difficult to change a part of a program. For example, changing an attribute or an operation which is defined in a parent class and which is used by a child class through inheritance may affect the child class and, as a result, make the child class incomplete. Therefore, when changing a part of a program, the user must determine the range of the effect and take appropriate actions for that range manually. In addition, to prevent the change from affecting other classes, it is necessary to cancel the class relationship in advance. This requires the user to re-write relevant information of associated classes. This is tedious because it must be done manually. So, with a prior object-oriented programming system, it is difficult to change a part of a program quickly and accurately and to fully enhance the efficiency and reliability of program development.

(2) In addition, in the analysis stage of development where the definition range of each class and class network structure must be defined, the class network itself often must be changed. In this case, a change in a class network structure also involves manual operation and, as a result, delays processing.

(3) An inheritance relationship prevents the user from understanding all the attributes and operations of the child class, because some of them are defined in the parent class. A prior object-oriented programming system does not support distribution of these attributes and operations to each child class. It is difficult for users to do so accurately and speedily.

A change in a class network structure through class relationship cancellation or generation involves class network structure conversions such as class data transfer which loosens class relationships.

SUMMARY OF THE INVENTION

A purpose of the present invention is to solve the problems of the prior art. That is, it is a purpose of the present invention to provide object-oriented programming system which performs an equivalent conversion of a class network structure. It is another purpose of the present invention to provide an object-oriented programming system which outputs easy-to-understand program data.

To attain the above purposes, the present invention accepts a range and a mode of equivalent conversion and, based on the range and the mode that have been accepted, performs the equivalent conversion on program data representing the contents of a program containing classes. This equivalent conversion automatically converts a class network structure represented by program data, thus increasing the efficiency and reliability of program development.

Since the present invention allows the user to specify the distribution of operations, cancellation of aggregation/association and cancellation of inheritance, it is easy to enhance class independence.

In the present invention, since the distribution of an operation is performed automatically by copying the operations of a parent class to child classes and then deleting the operations from the parent class, there is no need for the user to do so manually.

In the present invention, since the cancellation of aggregation/association is performed automatically by converting a relationship (aggregation or association) between a class and the parent class to the relationship between the class and each child class, there is no need for the user to do so manually.

In the present invention, since the cancellation of inheritance is performed automatically by copying all the attributes and operations of a parent class to child classes and then deleting the inheritance between the parent class and the child classes, there is no need for the user to do so manually.

In addition, the equivalent conversion introduced by the present invention allows a parent class to be generated for the attributes and operations, which are common to each class, for use in equivalent conversion so that the child classes may inherit them, making it possible to implement a simple program that can be viewed at a glance.

The present invention, which can accept a program data output format from an output format input means, allows the user to output data in a format that suits his needs. The present invention also allows the user to select a diagram-format output, increasing the readability of program data before and after conversion.

The present invention also allows the user to select an output format in which class definitions containing attributes and operations are output.

This output format, used in conjunction with the diagram display format, allows the user to output a specific class definition with a diagram displayed, further increasing the readability of the program.

That is, with the diagram displayed in one window on a multi-window display screen, the user can take action on the frame of the box representing the class with the use of a pointing device, such as a mouse, in order to display the class data in a sub-window associated with that class. Therefore, the user can easily confirm the required class definition that is displayed in an easy-to-understand format.

Figure 1:
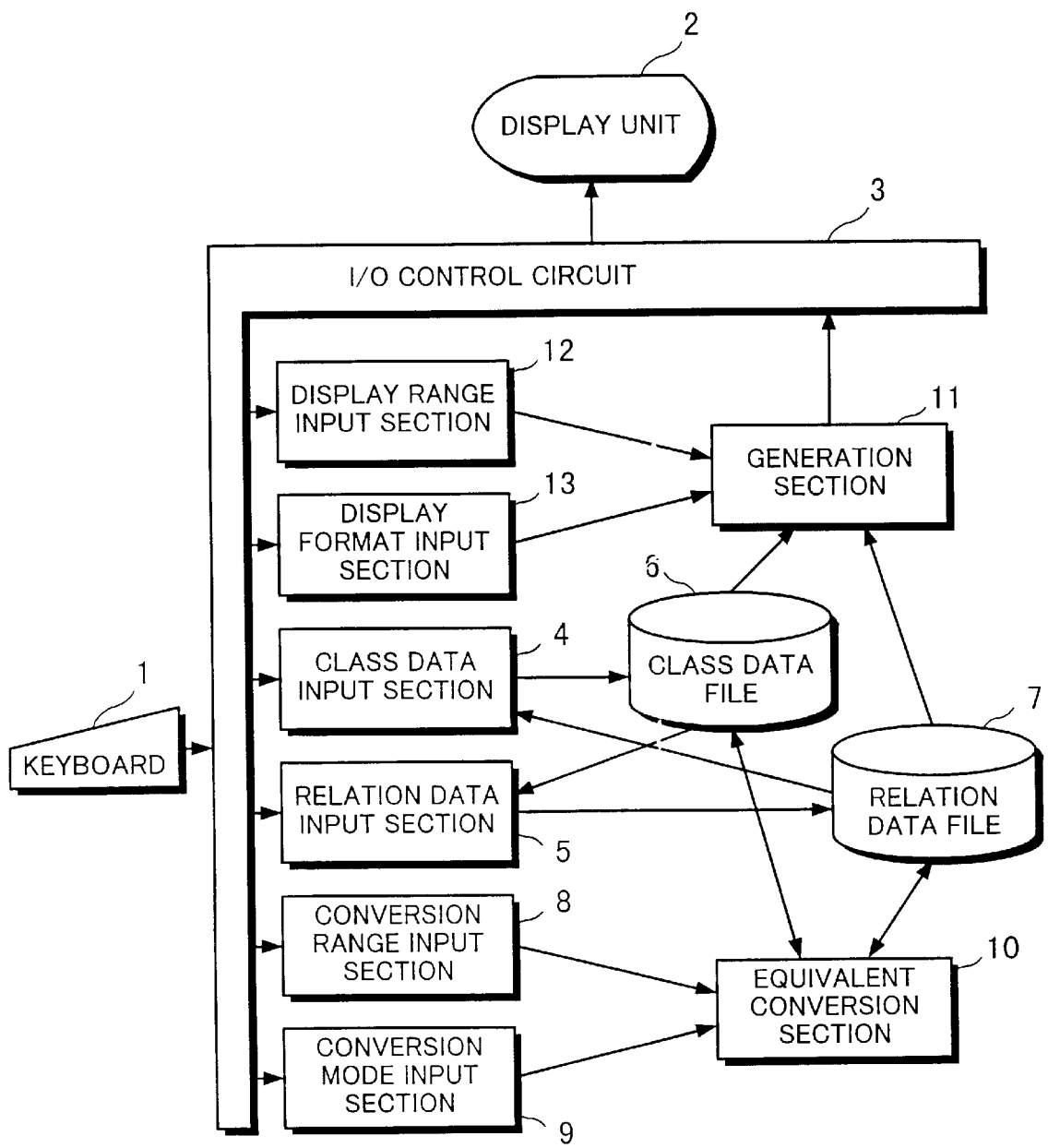
FIG. 1 is a functional block diagram showing the structure of an embodiment of the present invention.

In the Figures, 1 is a keyboard, 2 is a display unit, 3 is an I/O control circuit, 4 is a class data input section, 5 is a relation data input section, 6 is a class data file, 7 is a relation data file, 8 is a conversion range input section, 9 is a conversion mode input section, 10 is a equivalent conversion section, 11 is a generation section, 12 is a display range input section, 13 is a display format input section, and STEP is a step of a procedure.

DETAILED DESCRIPTION

An object-oriented programming system (hereinafter called "this system"), as an embodiment of the present invention, will be described in further details with reference to the accompanying drawings. This system is implemented on a computer, and each function of this system is implemented by running the computer according to a procedure stored in the form of a program. Therefore, in the following discussion, this system will be described, assuming virtual circuit blocks (means) each having an associated functionality.

In general, the computer comprises the CPU (central processing unit) and main storage consisting of RAM (random access memory). The computer can be of any size; that is, a microcomputer, personal computer, small computer, workstation, or mainframe computer may be used.

Typically, the hardware of the computer consists of input devices such as a keyboard and a mouse, external storage units such as a hard disk, output devices such as a CRT display unit and a printer, and input/output control circuits that are required.

The computer hardware configuration is flexible. That is, as long as the present invention can be implemented, some hardware components described above may be added, replaced, or deleted. For example, this system may be implemented on a computer network to which a plurality of computers are connected. The CPU may be of any type; a plurality of CPUs may be used or a single CPU may be used on a time-sharing basis to concurrently execute a plurality of processing. Other types of input devices may be used; for example, pointing devices such as a touch panel, light pen, or track ball; image input devices such as a digitizer, image reader, or video camera; voice recognition devices; and various sensors may be used. Other types of external storage devices may be used; for example, a floppy disk drive, RAM card unit, magnetic tape unit, optical disk unit, magnetic optical disk unit, bubble memory unit, or flash memory may be used. Other types of output devices may be used; for example, a liquid crystal display unit, plasma display unit, video projector, LED display unit, sound generation circuit, or voice synthesizer may be used.

Typically, the software for implementing this system on the computer comprises an application program for implementing each functionality of this system and an operating system under which the application program is executed. Program code required to implement this system is typically machine code generated as a result of compilation (translation) with the use of an assembler or compiler. The computer software configuration is also flexible. That is, as long as the present invention can be implemented, the software configuration may be changed. For example, an operating system is not necessary required and any type of programming languages may be used; for example, an interpreter (sequential interpretive execution mode) such as BASIC may be used.

The program may be stored on various types of unit. For example, it may be either in read-only memory (ROM) or on an external storage unit such as a hard disk for loading (reading) into main memory at computer startup time or processing start time. The program may be split into a plurality of sections for storing on an external storage unit so that some of those sections are loaded (read) into memory as necessary. Those sections may be stored on different modes.

The term "means" used in this specification refers to a conceptual means corresponding to each function of this system. There is not always a one to one correspondence between means and hardware units or software routines. For example, the same hardware component sometimes constitutes different means. In addition, the same means consists of a single statement or of a plurality of statements.

The order of steps in which the procedure in the embodiment is executed may be changed, plurality of steps may be executed concurrently, or the order of steps may be changed on each execution. The order can be changed, for example, through a user-selectable menu interface.

The term "input" used in the specification refers not only to the input of data but also to other processing closely associated with the input of data. Other processing include the output (echo back) of input data to the output device for confirmation or the modification/editing of input data. The term "output" used in the specification refers not only to the output of data but also to other processing closely associated with the output of data. Other processing include the input of a range to be output or the instruction of screen scrolling. In addition, input and output may be combined as an integrated operation through an interactive interface, and this integrated operation is applicable to an input operation—selection, specification, or identification—which is prompted by some output data. Data mentioned in the specification may be stored in any form in a data storage means or in the computer. For example, data may be located anywhere: main storage, external storage, CPU registers, or cache memory. In addition, data may be stored in any form. For example, data may be stored and accessed by directly accessing physical addresses on storage devices such as memory or disks. Data may be represented in any form. For example, a character string may be stored on a character basis or on a word bases. In addition, data is held for a specified period of time and, after that, it may be erased; that is, data may be held in storage as long as the user wishes. Data not to be changed for the time being, such as dictionary data, may be stored in ROM.

Reference to specific items is made in this specification just for confirmation. So, just because some items are not referenced in this specification, it does not mean that they are not used. The operation of the system implemented by the present invention involves such items as pointers, counters, flags, parameters, and buffers as necessary.

Unless otherwise specified, data used by each part of the system is obtained from another part containing that data. For example, data is obtained by accessing a variable or memory location containing that data. Erasure or cancellation of data is not always done by deleting that data from the storage area; instead, it may also be done by changing the data modifier—for example, by setting the erase flag.

The system is assumed to be implemented on a computer, but all or part of this system may also be implemented in an electronic circuit.

1. Structure of embodiment

FIG. 1 is a functional block diagram illustrating the structure of this system. As shown in this figure, this system has a keyboard 1 for the user to enter data, a display unit 2 for data output, and an I/O control circuit 3.

This system also has a class data input section 4 which accepts class data representing the classes of a program as well as a relation data input section 5 which accepts relation data representing class relations such as inheritance, aggregation or association between classes, both from the keyboard 1.

This system also has a class data file 6 in which class data are stored as well as a relation data file 7 in which relation data are stored.

On one hand, class data comprises the data of each class, such as the position of the class on the display, the name of each attributes or operations of the class, and all the relation data numbers representing which of the relation data in the relation data file 7 are associated with the class. On the other hand, relation data consist of the data of each relation, such as the position of the relation on the display, the relation type (inheritance, aggregation or association) and all the class data numbers representing which of the class data in the class data file 6 are associated with the relation. Since the system can get relations from class data, and classes from relation data, the system can trace relations from a class to another class. Note that class data and relation data correspond to the program data.

This system has a conversion range input section 8 coupled to the keyboard 1. It accepts the range of equivalent conversion, for example, the range is which operations or relations of a class are to be distributed, or which relations are to be cancelled on the class network structure of the program.

This system also has a conversion mods input section 9 that accepts the mode of the conversion from the keyboard 1. In this system the mode of equivalent conversion is assorted into three types, such as operation distribution, aggregation/association cancellation, and inheritance relation cancellation. Each of them will be described later in detail. Note that the conversion range input section 8, keyboard 1, and I/O control circuit 3 correspond to a conversion range input means.

In addition, this system has an equivalent conversion section 10 which performs equivalent conversion on class data and relation data based on the range and the mode.

This system has a generation section 11 that generates the display data of a diagram, tracing class to class continuously, from the class data and the relation data. Note that the generation section 11, I/O control circuit 3, and display unit 2 correspond to a data output means.

In addition, this system has a display range input section 12 which accepts the display range of the diagram from the keyboard 1. Note that the display range input section 12, keyboard 1, and I/O control circuit 3 correspond to a output range input means.

The display format input section 13, keyboard 1, and I/O control circuit 3 correspond to an output format input means. This system has a mouse as a pointing device, which is not shown in the figure. The mouse pointer on the display screen moves around the screen as the user moves the mouse.

2. Operation of the embodiment

The embodiment which has the above structure operates as described below. That is, when the user enters class data from the keyboard 1 via the class data input section, the class data is stored in the class data file 6. When the user enters relation data from the keyboard 1 via the relation data input section, the relation data is stored in the relation data file 7.

Figure 2:
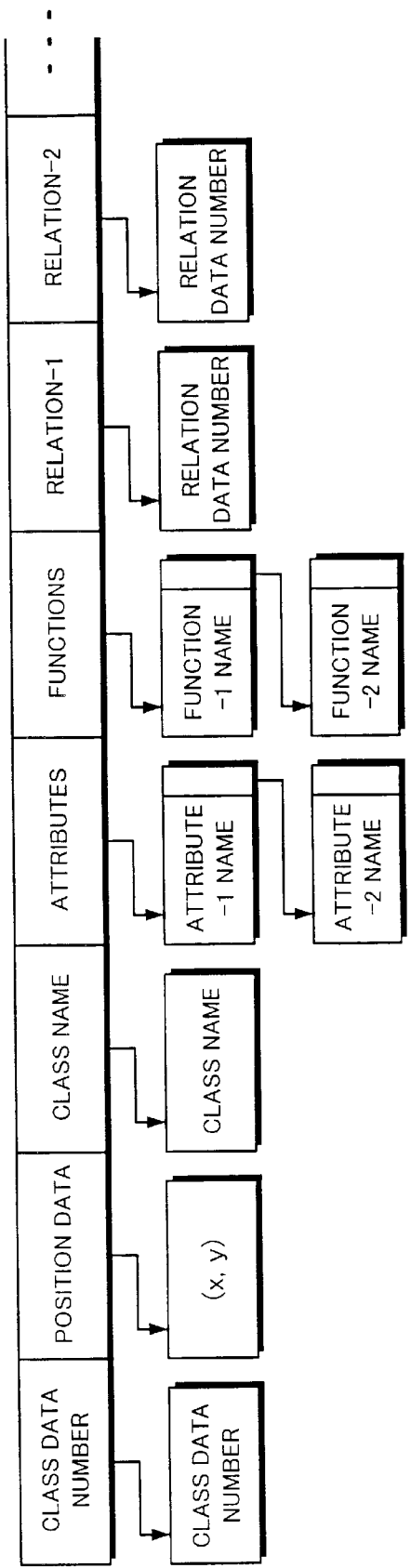
FIG. 2 shows the general format of class data used in an embodiment of the present invention.

FIG. 2 shows the general format of class data used in the embodiment. The position data field contains the display position coordinates where the class is displayed on the diagram display screen, and the name, attributes, or function field contain the name, attributes, operations of the class respectively, and the relation field contains data identifying the class associated with the class.

Figure 3:
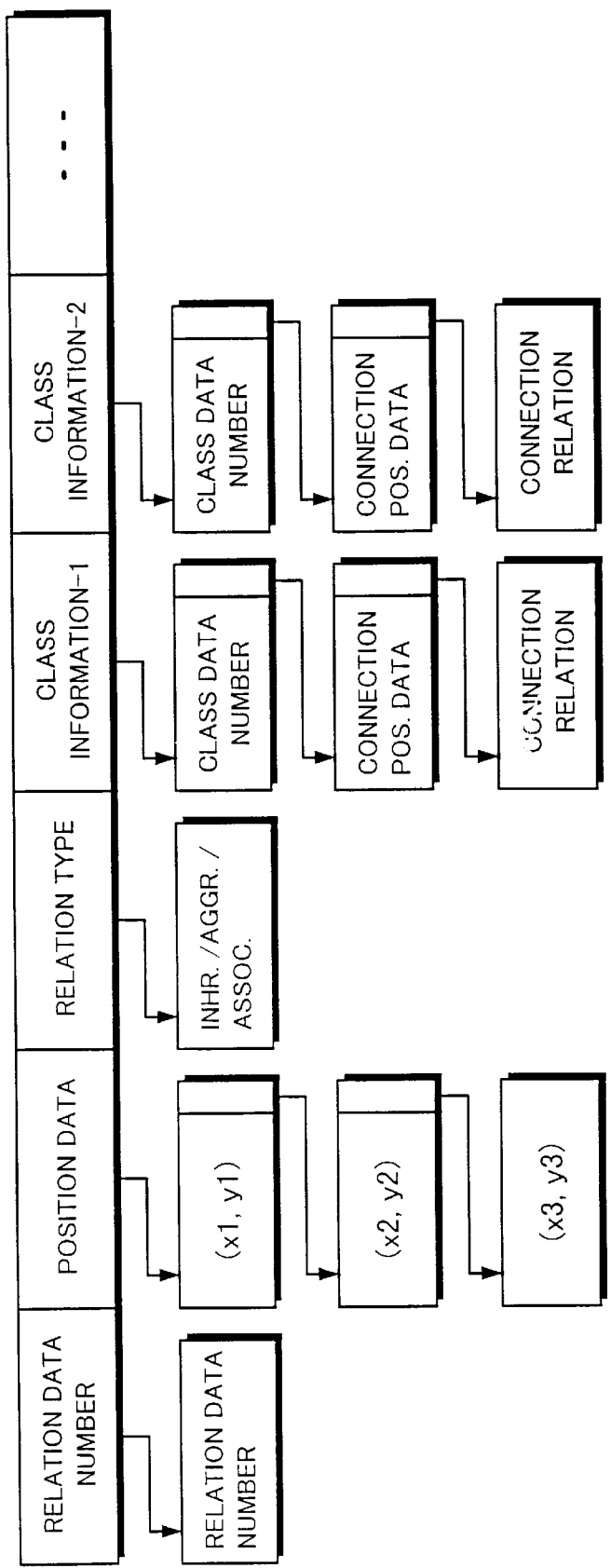
FIG. 3 shows the general format of relation data used in an embodiment of the present invention.
Figure 4:
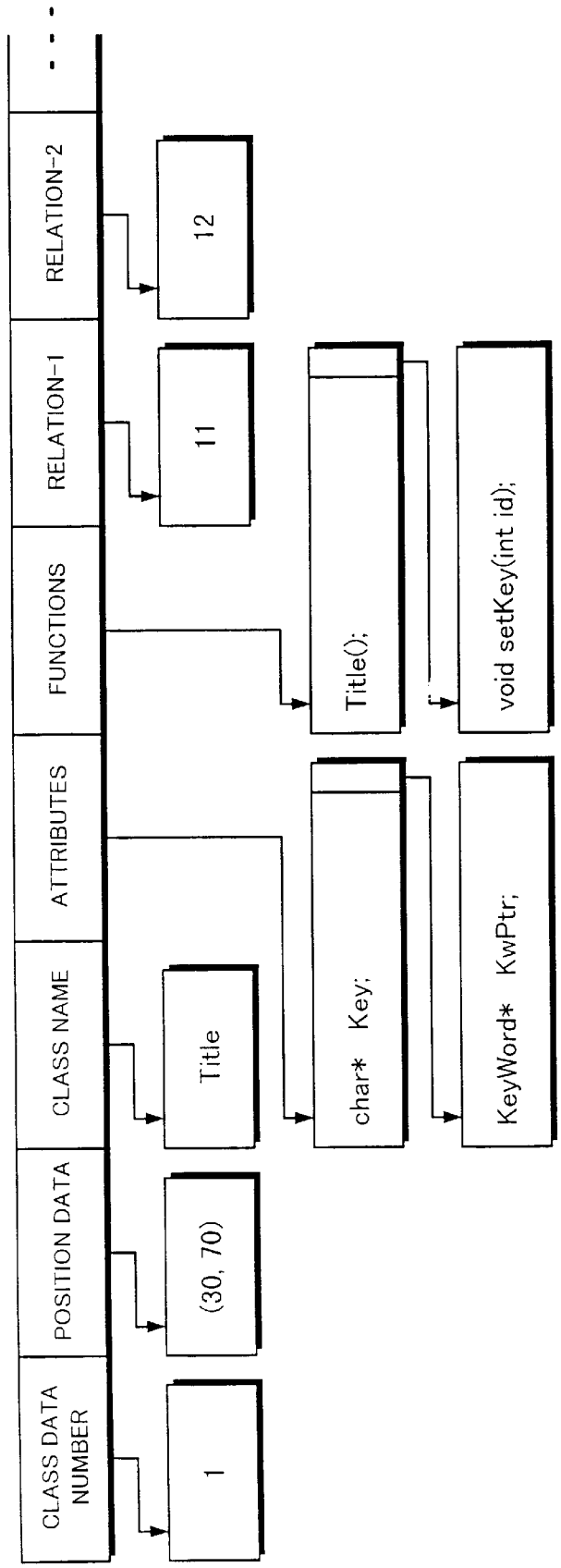
FIGS. 4, 5, and 6 show a class data example used in an embodiment of the present invention.
Figure 5:
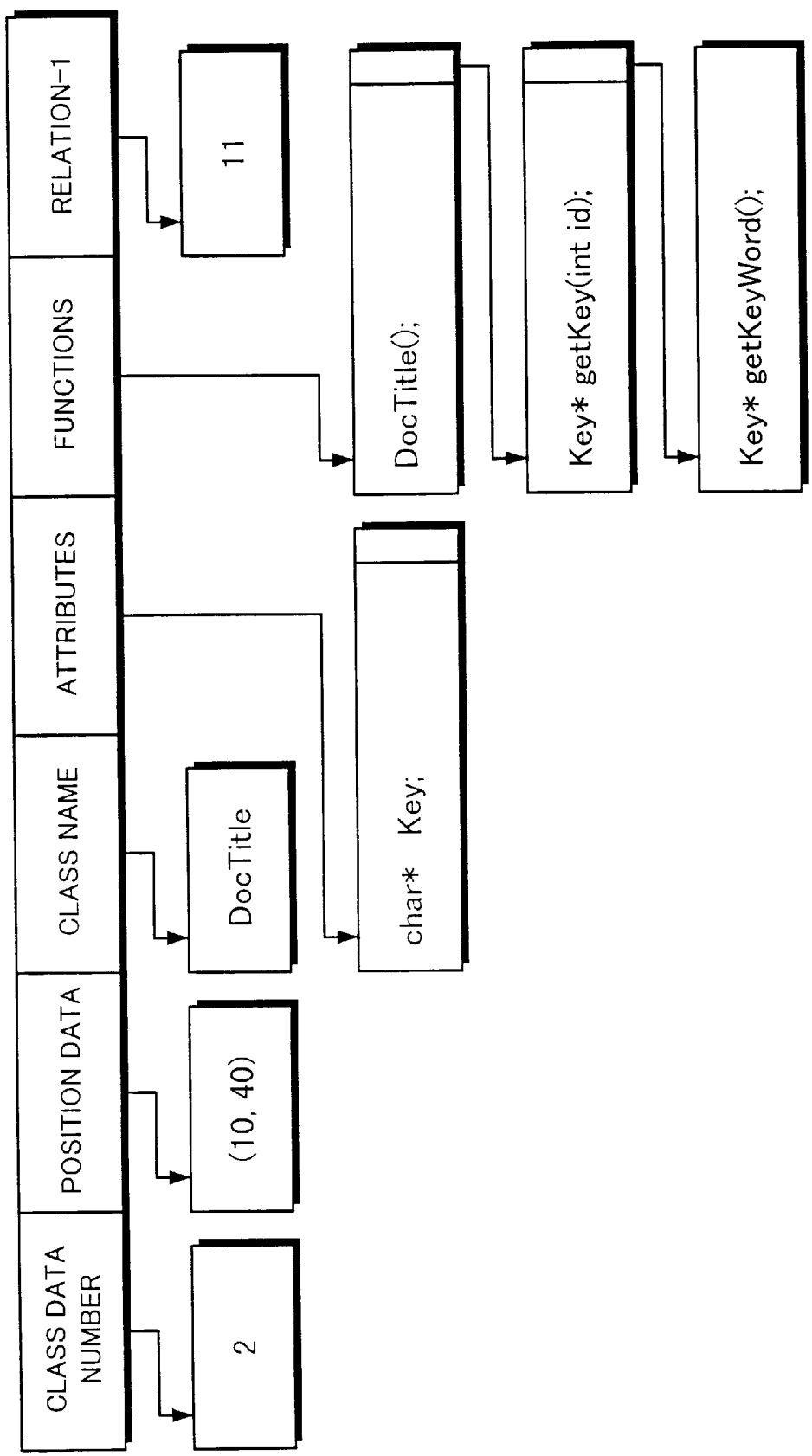
Figure 6:
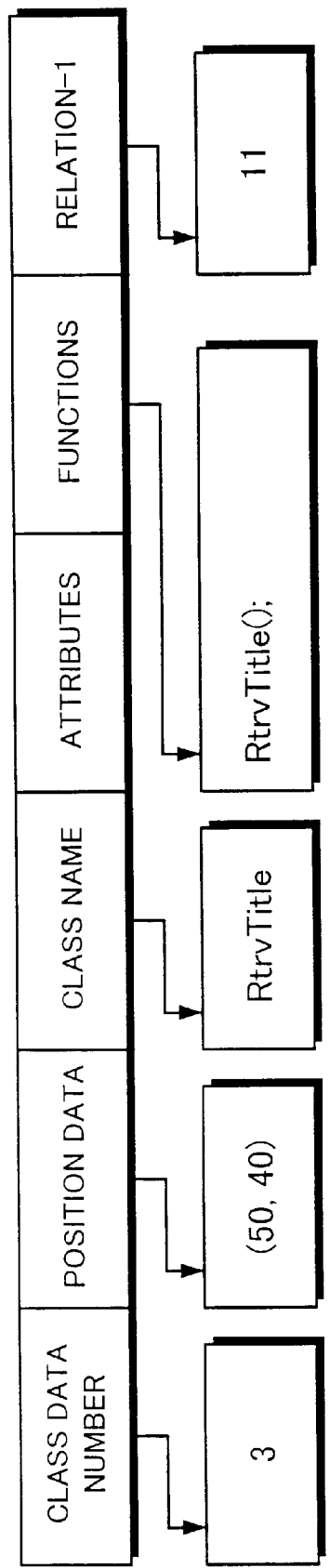
Figure 7:
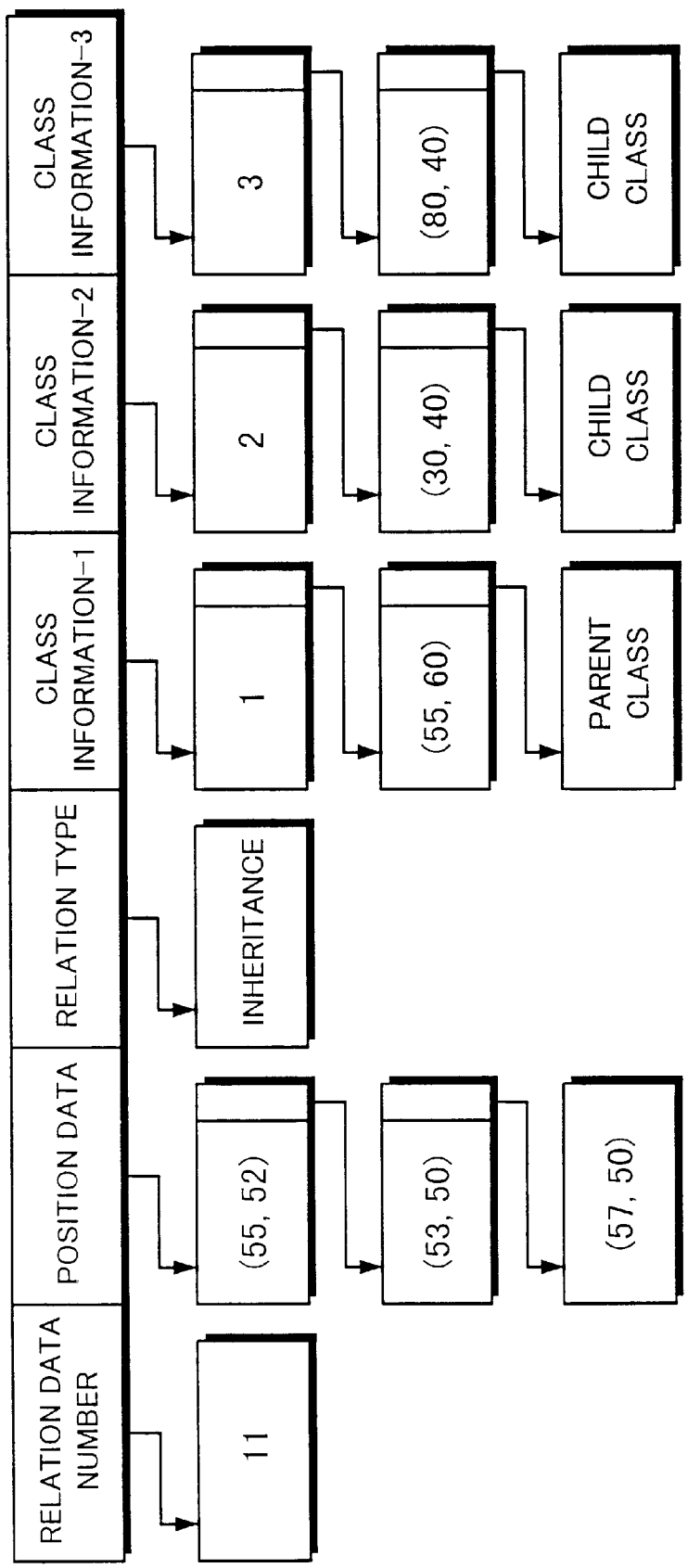
FIG. 7 shows a relation data example used in an embodiment of the present invention.

FIG. 3 shows the general format of relation data used in the embodiment. In this figure, the type field contains the type of class relation such as inheritance (inhr.), aggregation (aggr.) or association (Assoc.), connection position (pos.) data field contains a positional relation with a symbol representing the relation among classes on the diagram display screen. FIGS. 4–6 show class data examples, and FIG. 7 shows a relation data example.

As described above, both the class data and the relation data contain position data, and this position data indicates the display position of the frame for a class as well as the display position of the graphic representing the class relation. This position data eliminates the need for calculating the display position of each class at display time, and the display position is automatically determined based on each class relation.

In this embodiment, not data constituting the program such as source code, but class data representing the contents of each class and relation data representing each class relation are used as the program data. Therefore, separating class internal data from class external data becomes possible.

In addition, class data and relation data may or may not be specific. Thus, even when the program contents are not yet determined specifically, for example, in the program design stage, equivalent conversion may be performed using class network structure data determined at that stage in the same manner as for a completed program.

When the generation section 11 generates diagram display data from the class data and relation data, a diagram is displayed on the display unit 2.

If the user wishes to change the diagram display range (that is, a range of display classes for class data and relation data) or the display format, he enters (selects) a display range from the keyboard 1 via the display range input section 12 or he enters (selects) a display format from the keyboard 1 via the display format input section 13.

Thus, this system allows the user to enter a range and a format of program data output from the output range input means or output format input means, giving the user the range of data that meets his needs.

To perform equivalent conversion on program data thus entered and displayed, the user enters (selects) a conversion range from the keyboard 1 via the conversion range input section 8 and, in addition, enters (selects) a conversion mode from the keyboard 1 via the conversion mode input section 9.

When a conversion range and a conversion mode are entered, the equivalent conversion section 10 performs equivalent conversion on class data and relation data based on the conversion range and the conversion mode. Note that the class network structure of a program represented by class data and relation data is a structure represented by class data and relation data; so, equivalent conversion on class data and relation data means equivalent conversion on a class network structure of the program represented by them.

Figure 8:
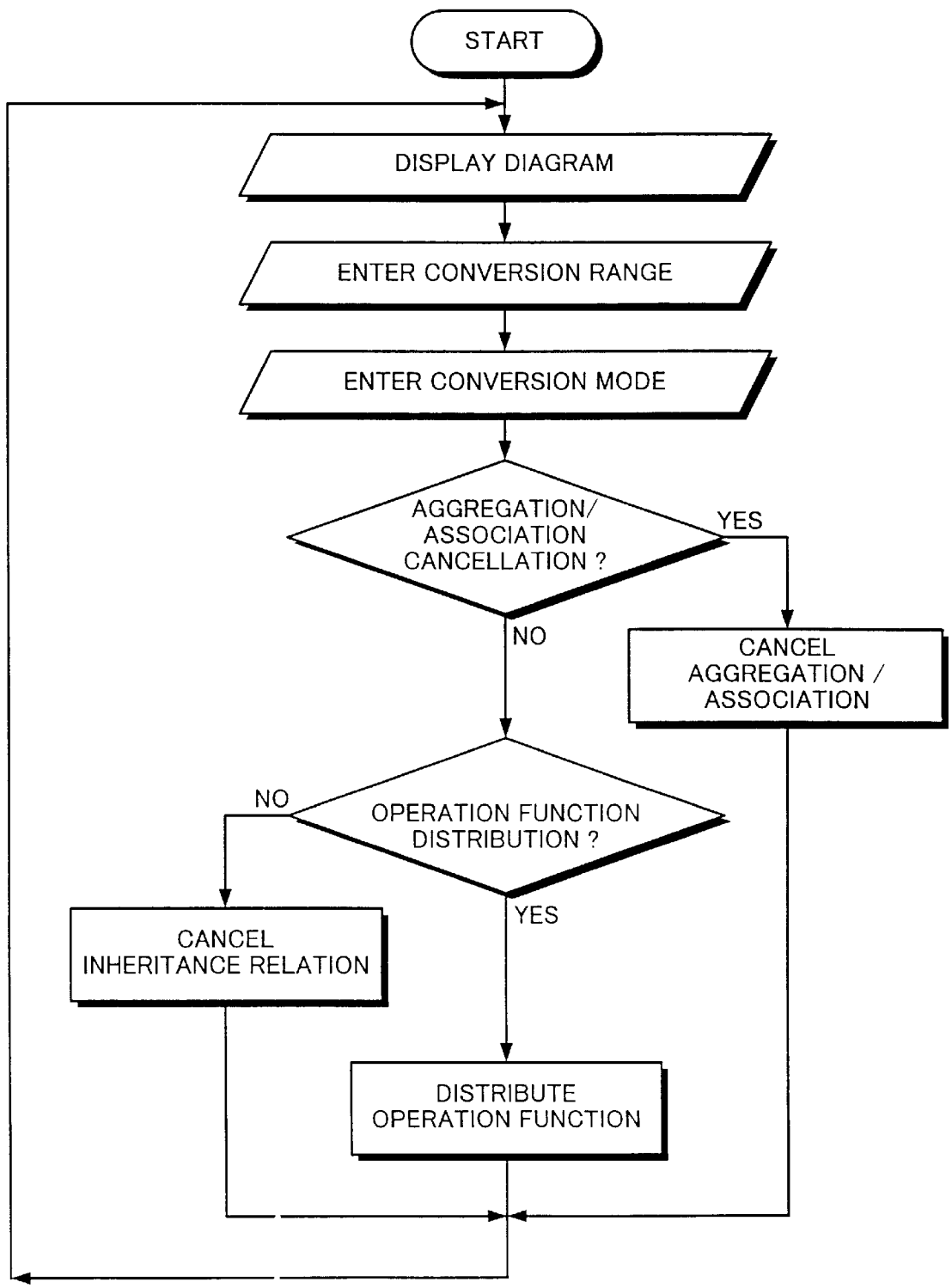
FIG. 8 is a flowchart illustrating the processing procedure of an embodiment of the present invention.

FIG. 8 is a flowchart illustrating an example of processing from diagram display to equivalent conversion performed by this system. The order of steps, such as those in the input section, may be controlled by this system automatically according to the interactive input/output procedure or may be determined by the user according to the menu-driven input/output procedure.

Operations distribution shown in FIG. 8 is done automatically by copying an operation of a parent class in inheritance relation to a child class and by deleting the operation from the parent class. Aggregation/association Cancellation is done automatically by converting the included class (partial class) included by a parent class, which is the whole class, to the partial class of each child class, or, by relating another class which has been associated to a parent class to each child classes, then instead, deleting the aggregation or association relation between the partial class and the parent class.

Inheritance relation cancellation is done automatically by copying all the attributes and operations from a parent class and by deleting the inheritance relation between the parent class and the child class.

As described above, this embodiment allows the user to specify operation distribution, aggregation/association Cancellation, inheritance relation cancellation, as the mode of equivalent conversion, making it possible to increase the independence of each class. In addition, equivalent conversion is done automatically in this embodiment, the user need not perform manual operation.

3. Equivalent conversion example

Figure 9:
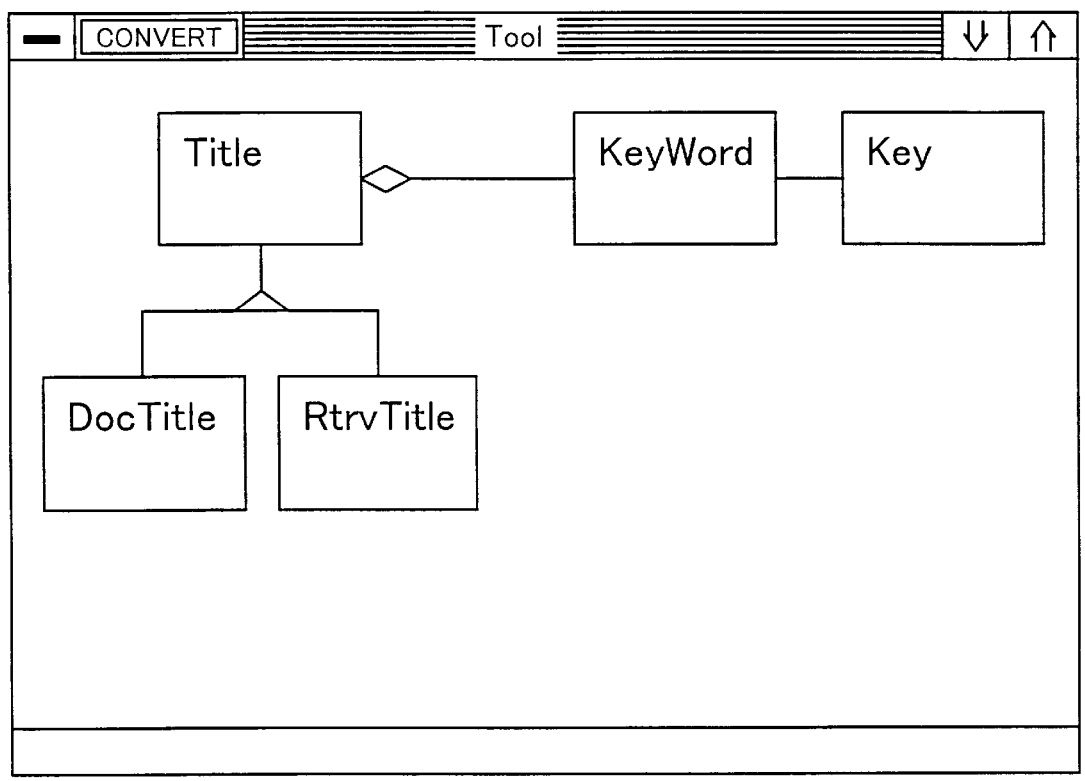
FIGS. 9, 11–18, 20–25, and 27–29 show screen display examples of an embodiment of the present invention.

An example of equivalent conversion by this system is shown. FIG. 9 shows an example of class data and relation data entered into this system with the list of class names displayed in the diagram format. In the diagram format display provided by this system, a class is represented by a rectangular frame with the name of the class within it. A class relation is represented by a line between two frames, with different line types indicating different type of relations. That is, the inheritance relation in represented by the line between a parent class and a child class with a triangle on it, and the aggregation relation by the line between a whole class and a partial class with a rhomb at the and of the line on the whole class side and the association relation is represented by the line between two classes. A display range may be selected for each class.

This system lets the user to select a diagram format as the output format of program data to increase the readability of program data before and after conversion. In addition, this system displays each class using a corresponding frame, and a class relation using a graphic of a different shape, to enable the user to understand the program contents at a glance.

That is, when the generation section 11 draws a diagram, it draws a specific type of frame (that is, a box) indicating a class as well as a class name, based on the class data of each class. Then, based on relation data, it draws a symbol indicating a relation. When drawing a symbol, it determines the associated class and the direction for each relation.

In FIG. 9, the parent class "Title" has the inheritance relation with child classes "DocTitle" and "RtrvTitle", and the parent class "Title" has elements common to the child classes "DocTitle" and "RtrvTitle". In addition, the parent class "Title", which is the whole class, has the aggregation relation with the partial class "KeyWord".

A display range may be selected for each class. In addition, a class definition display may be selected as one of display format options. A class definition is the definition of a class attribute and an operation for each class.

To perform equivalent conversion on this screen, the user must select a range on which conversion is to be performed. This may be selected on a class basis or on a class relation basis. Because of this, conversion may be restricted to only the required range.

3-1. Operation distribution

Figure 10:
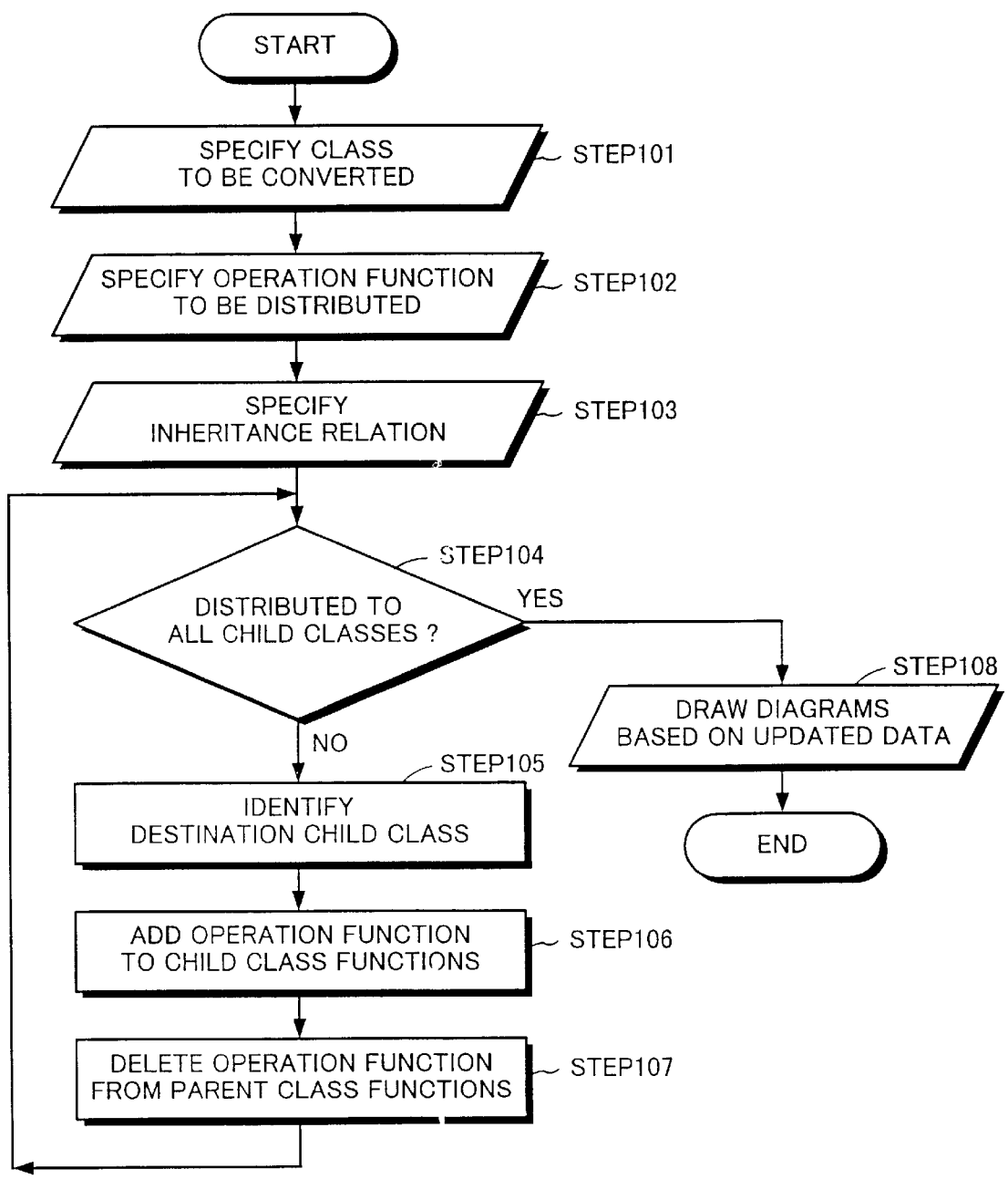
FIG. 10 is a flowchart illustrating the operation distribution procedure used in an embodiment of the present invention.

FIG. 10 is a flowchart illustrating the procedure for "Operation distribution" which is one of conversion modes. In this procedure, the user must first specify a class to be converted (step 101).

Figure 11:
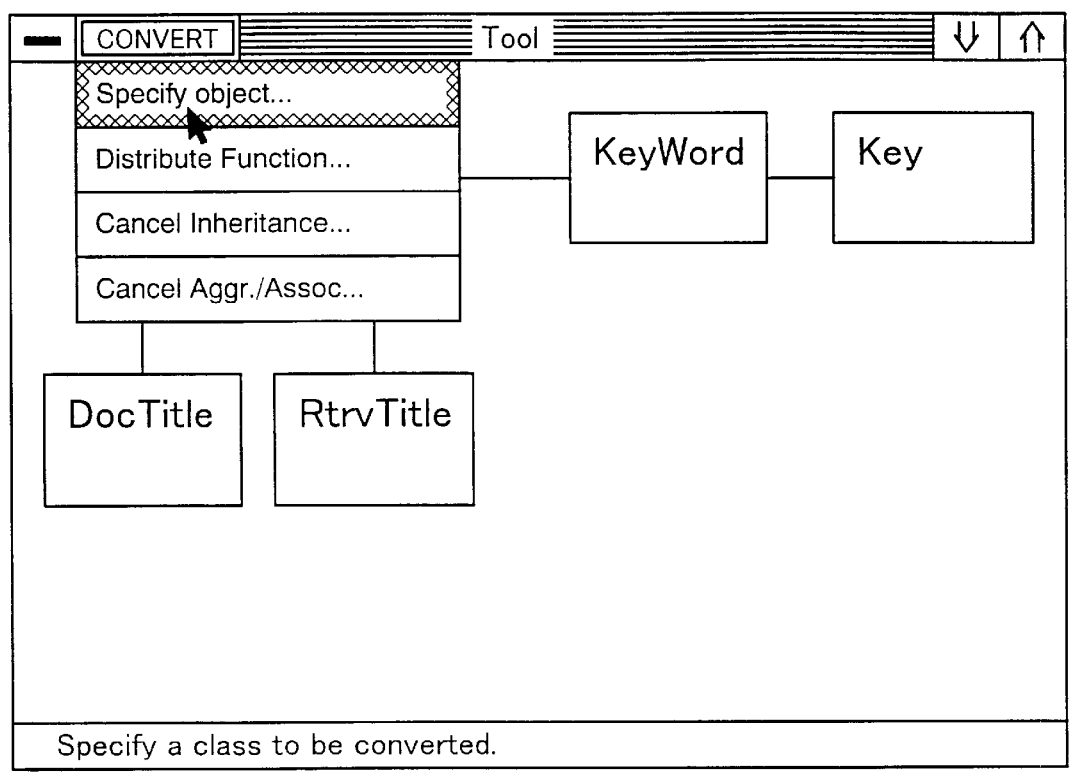

That is, when the user clicks on the menu button "Conversion Processing" displayed at the upper-left corner of this screen, the pull-down menu indicating the type of processing is displayed (FIG. 11). This menu remains displayed while the user holds down the click button. When the user moves the mouse while holding down the click button of the mouse (drag), a choice pointed to by the mouse pointer is displayed in reverse video (FIG. 11). When the user releases the button while a choice is displayed in reverse video, that choice is selected for execution.

Figure 12:
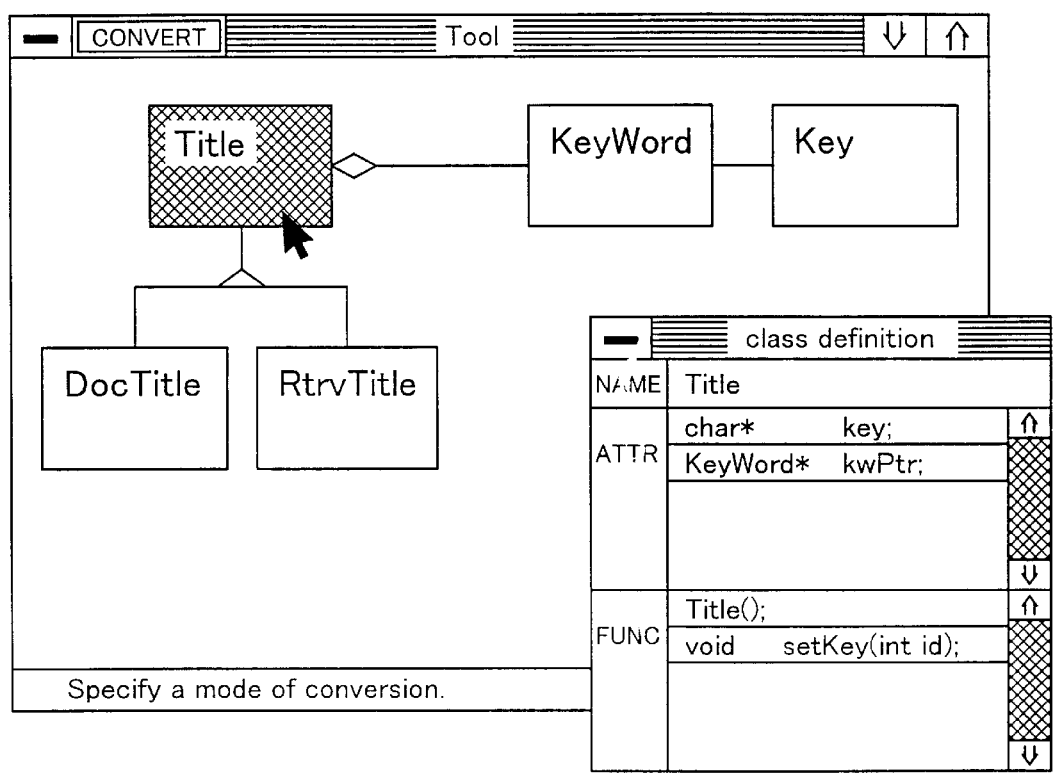

When "Specify object (Class)" is selected (FIG. 11), the message requesting the user to specify a class on which equivalent conversion is to be performed is displayed. When the user clicks on one of the boxes, the class definition, such as the name of the box, attributes (ATTR), and functions (FUNC), is displayed in a new window (sub-window) for that class in a tabular format based on class data (FIG. 12). In FIG. 12, a smaller window is overlapped on the underlying window.

Figure 13:
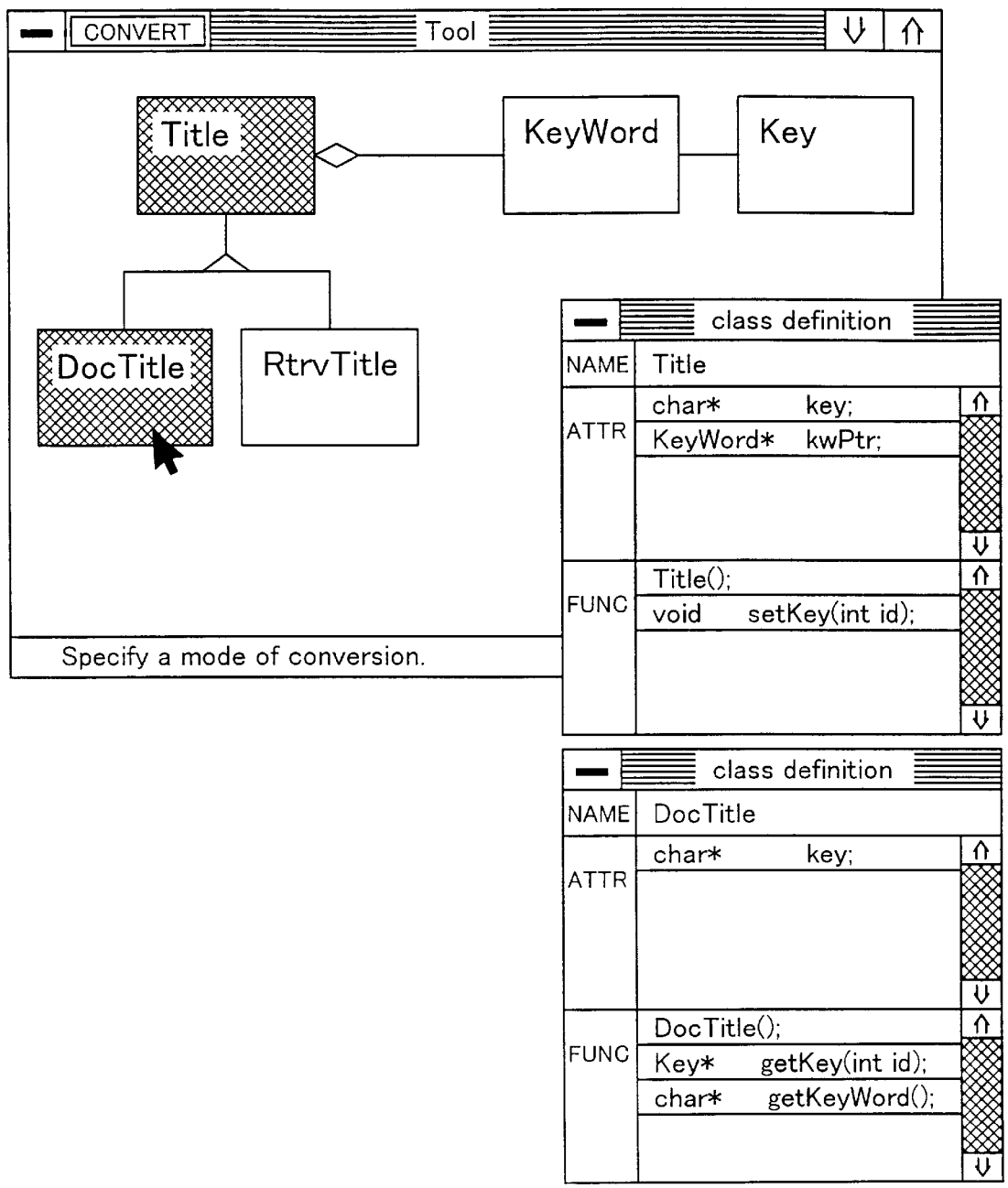

Therefore, when the user clicks on a plurality of boxes, as many sub-windows as the user has clicked on appear on the screen, each with the list of the class name, attributes, and functions (FIG. 13). Since this system allows the user to enter a program data output format from the output format input means via the mouse, the user can output program data in the format that meets his needs.

In addition, this system allows the user to select whether or not the class attributes on operations are to be included in the display of class data. This system combines this output format with a diagram. Thus, the user can display class data by performing operation with the diagram displayed, further increasing program readability.

In particular, this system displays the diagram in one of windows on the multi-window screen and, when the user performs operation on the frame of a class with a pointing device such as a mouse, the class data of the class is displayed in a sub-window which is a new window corresponding to the class. Therefore, the user can confirm only the required class data in a simple, easy-to-understand format.

Figure 14:
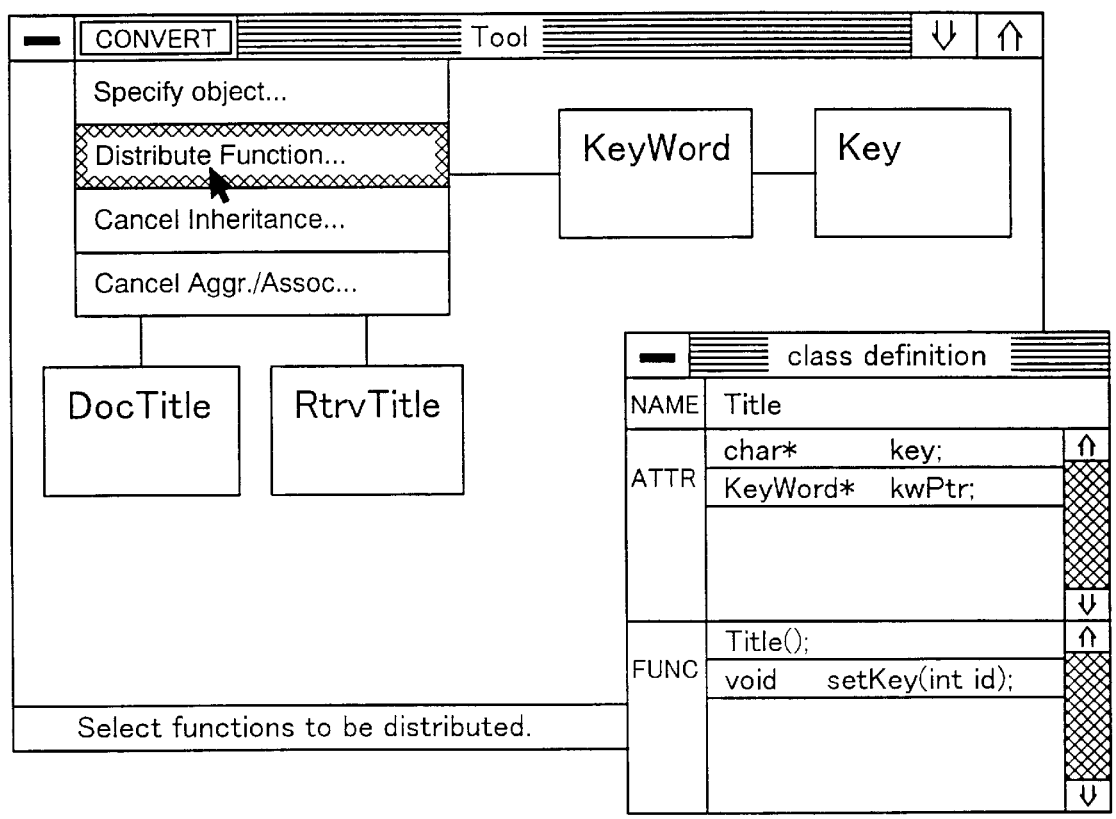
Figure 15:
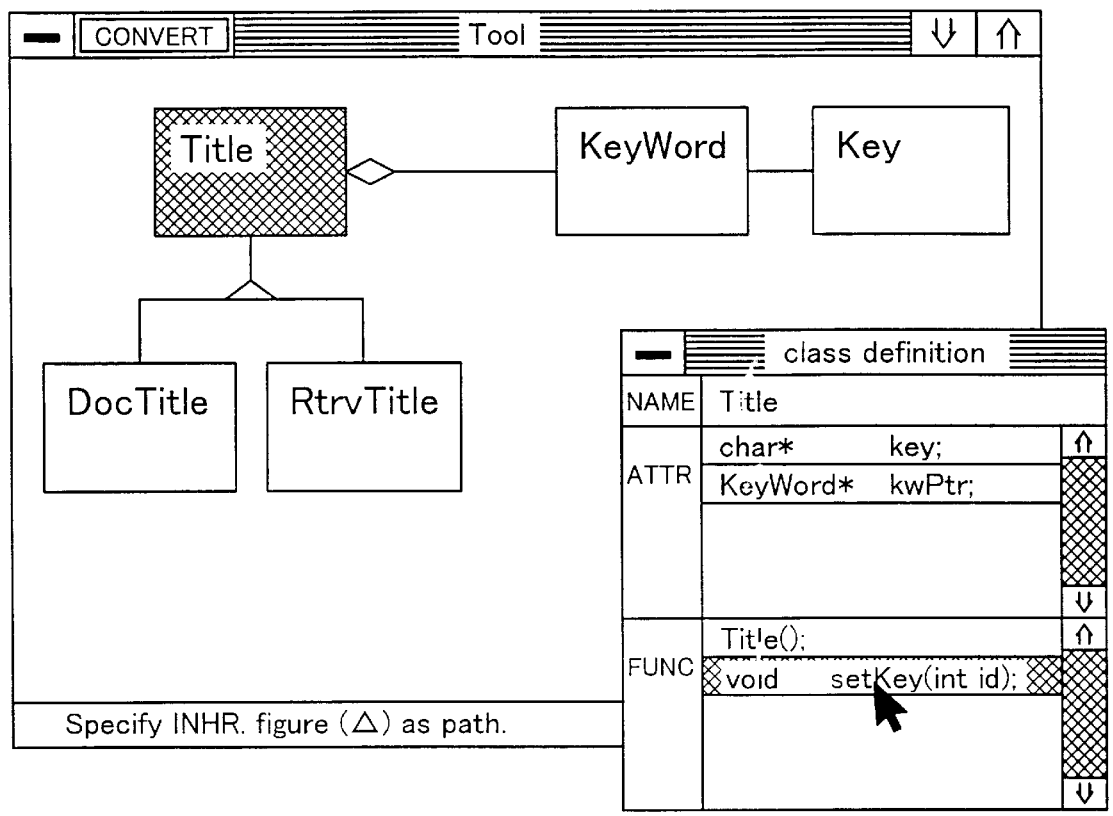

When the user selects "Distribute (Operation) Function" from the "CONVERT (Conversion Processing)" menu (FIG. 14), the message requesting the user to select a function to be distributed is displayed in the message field and the user can select a function to be distributed (step 102). That is, when the user clicks on one or more functions displayed in the sub-window, those functions are selected and displayed in reverse video (FIG. 15). At the same time, the name of the class to which the selected function belongs, the relation maintained by the class, and all the classes associated with each relation are identified. Since function distribution may be performed on a function basis in this embodiment, it is easy to restrict the functions to be distributed to those that are actually required.

Once one or more functions are selected, the user can specify a child class to which those functions are distributed, and the message prompting the user to specify it is displayed (FIG. 15). At this time, when the user clicks on the symbol indicating inheritance, the inheritance relation is selected (step 103) and the boxes of all the classes associated with the inheritance relation are displayed in reverse video (FIG. 16).

Figure 16:
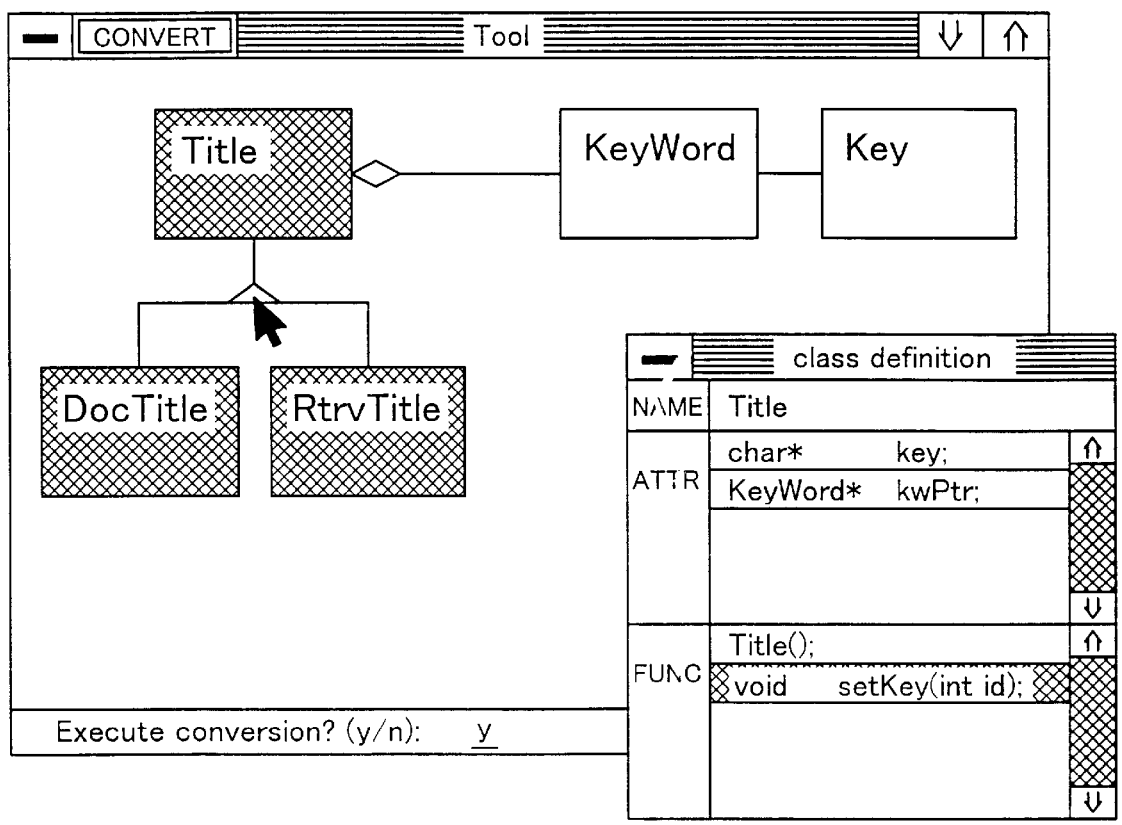

In FIG. 16, the class "Title" is selected as the parent class, and the classes "DocTitle" and "RtrvTitle" are selected as the child classes. In addition, the integer (int) operation setKey(int id) of the parent class "Title" is selected. And the message asking whether or not conversion processing is to be performed is displayed in the message field.

Figure 17:
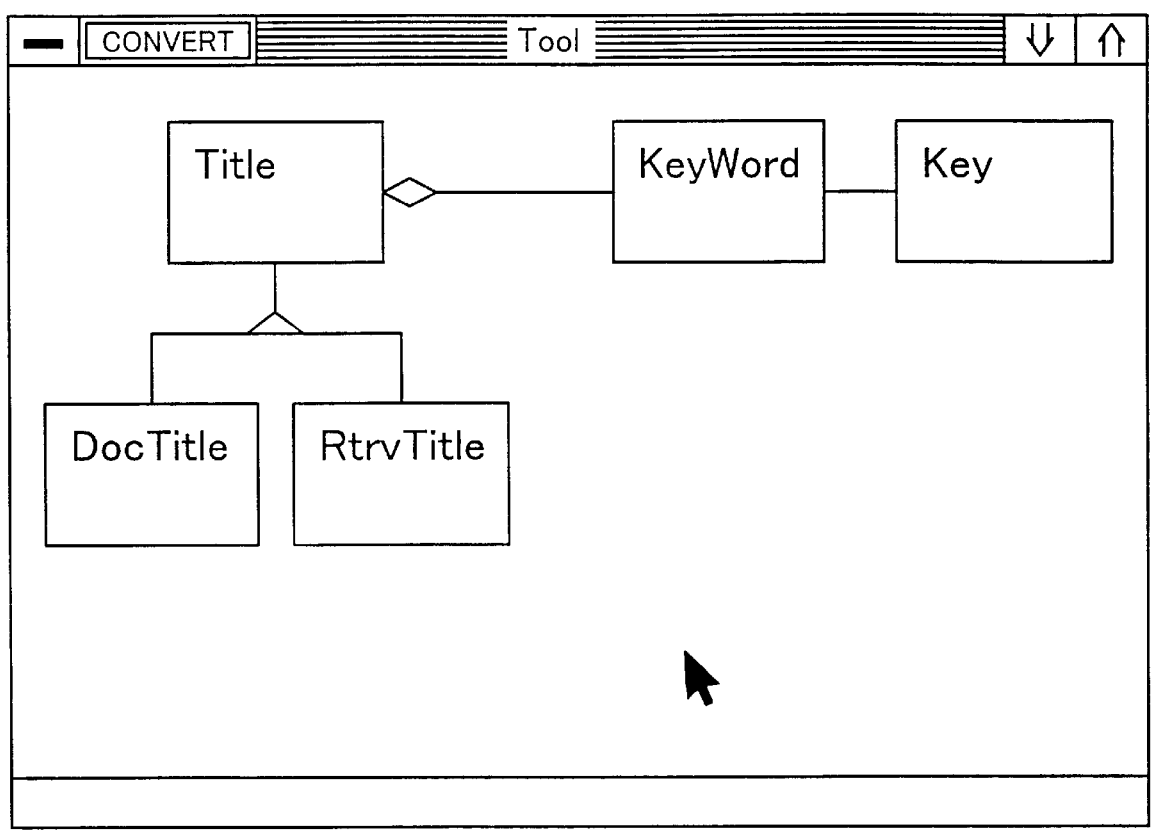

When the user starts operation, for example, by keying (FIG. 16), the selected operation is distributed to the selected child classes. That is, all the selected child classes (step 104) are sequentially identified (step 105), the specified function is copied and added from the class data of the parent class to the functions of the class data of all the identified child classes (step 106), and then the function is deleted from the group of functions of the parent class (step 107). After that, the diagram is drawn again based on the data updated as a result of distribution (Step 108, FIG. 17).

Figure 18:
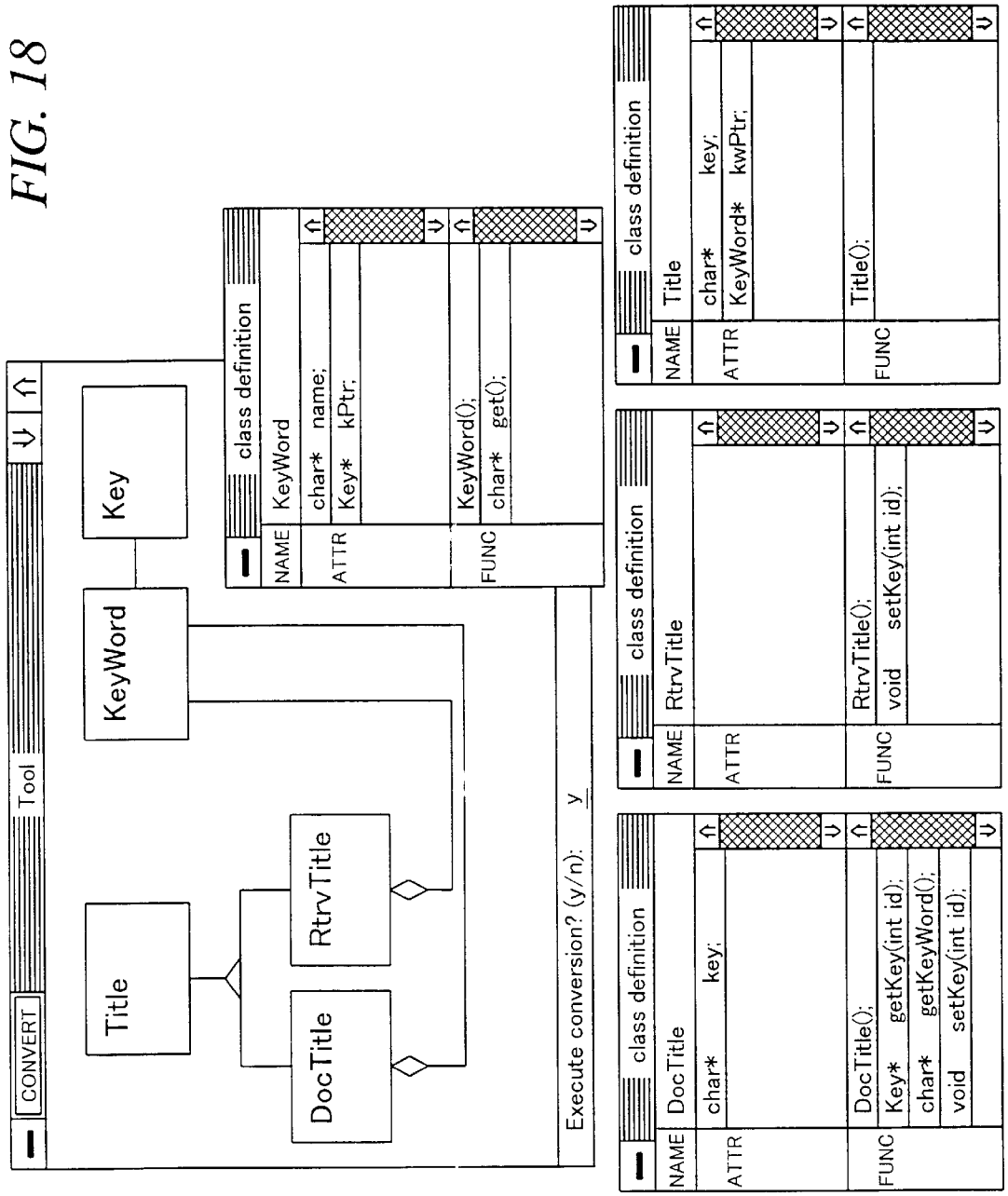

After distribution, when the user clicks on the box of a child class, the class definition of the child class is displayed in a sub-window (FIG. 18), so that the user can confirm the result of distribution.

In this figure, the integer (int) operation setKey(int id) of the parent class "Title" is distributed to the child classes "DocTitle" and "RtrvTitle".

3-2. Aggregation/association cancellation

Figure 19:
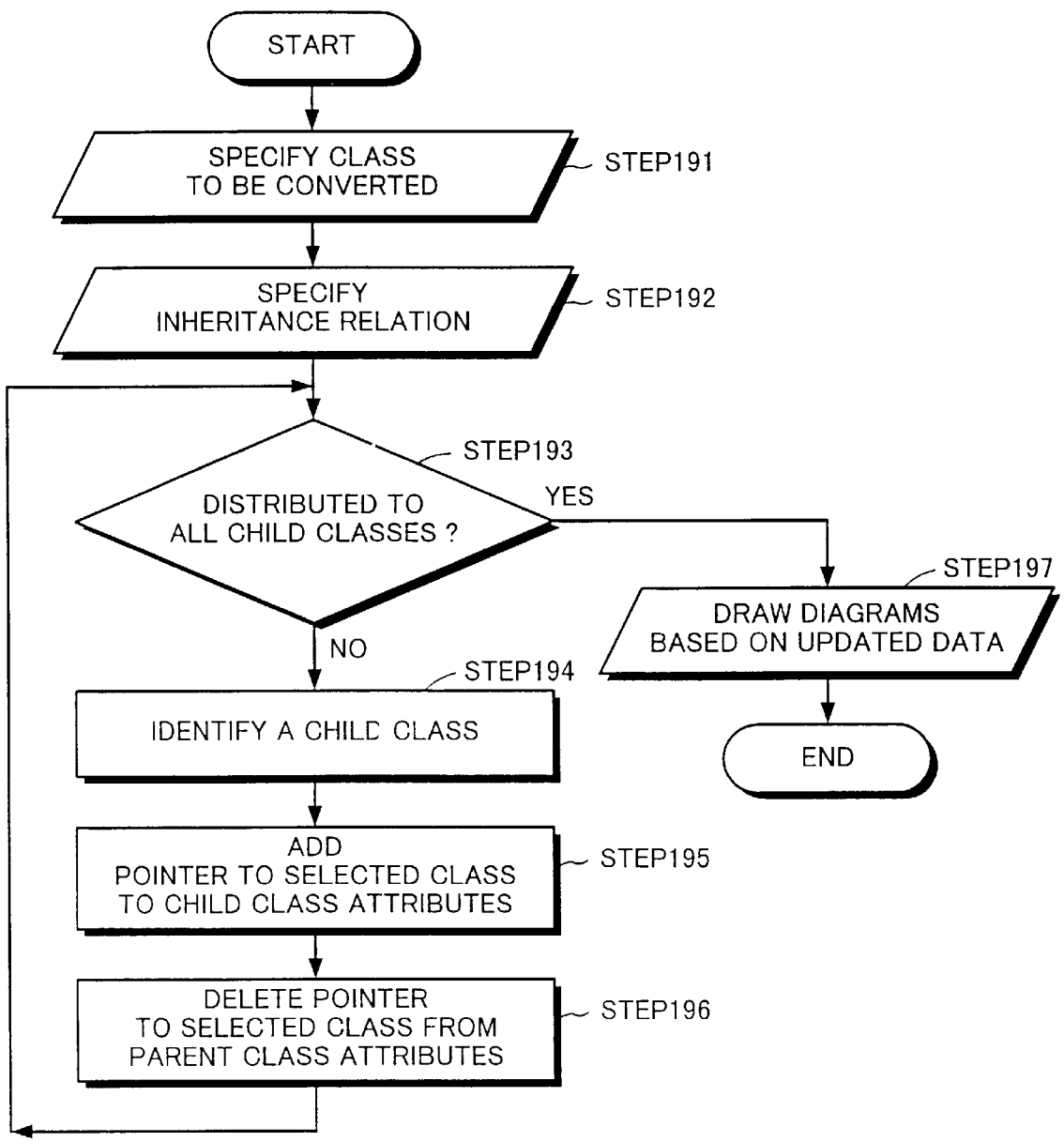
FIG. 19 is a flowchart illustrating the aggregation/ association cancellation procedure used in an embodiment of the present invention.
Figure 20:
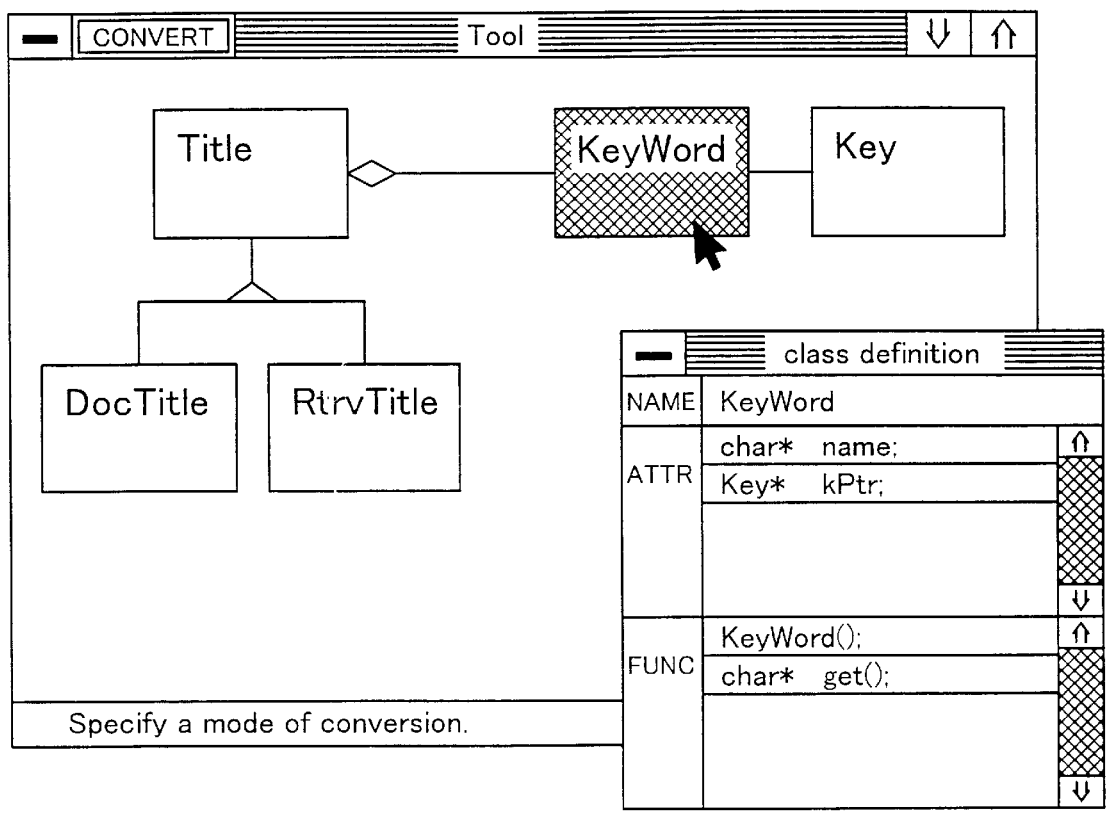

FIG. 19 is a flowchart illustrating the procedure for "aggregation/association cancellation", which is another conversion mode. In this procedure, the user first specifies a class on which equivalent conversion is to be performed (step 191, FIGS. 11, 20), in the same manner as with "operation distribution". This is done by specifying the class to be distributed with the use of the pointing device; then, the class definitions of the specified class are displayed in the subwindow. The user can select the class to be distributed on a function basis; in that case, the selected function is displayed in reverse video.

Figure 21:
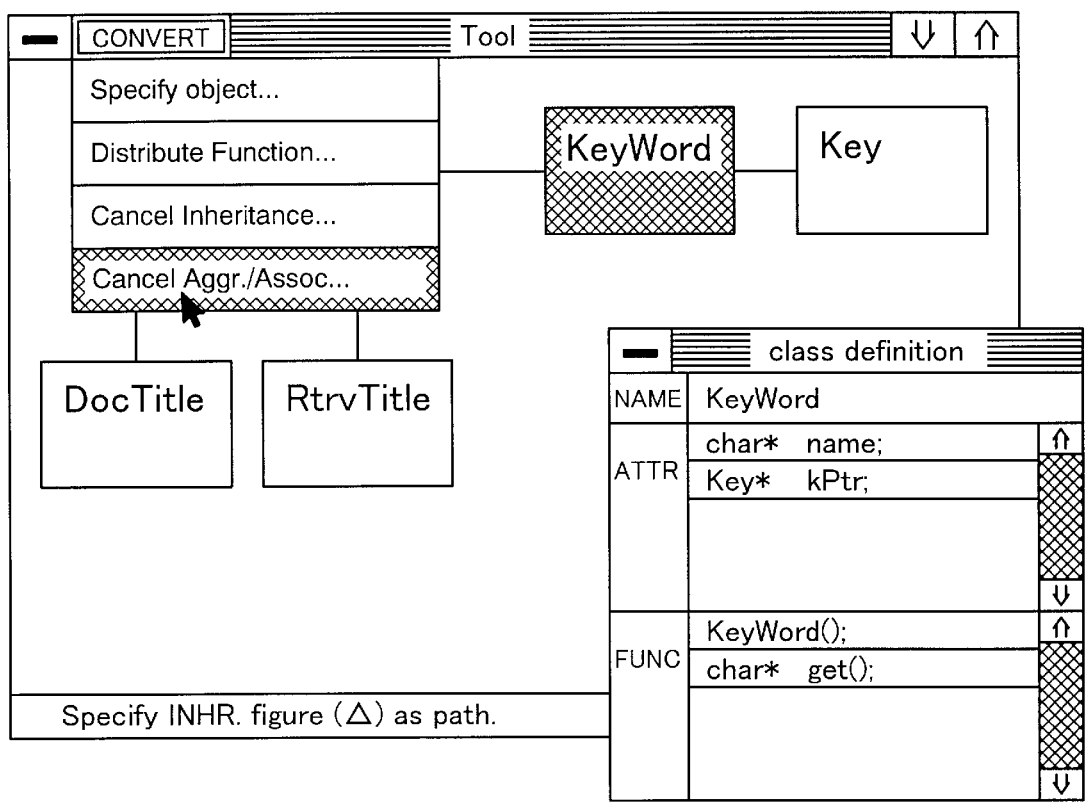
Figure 22:
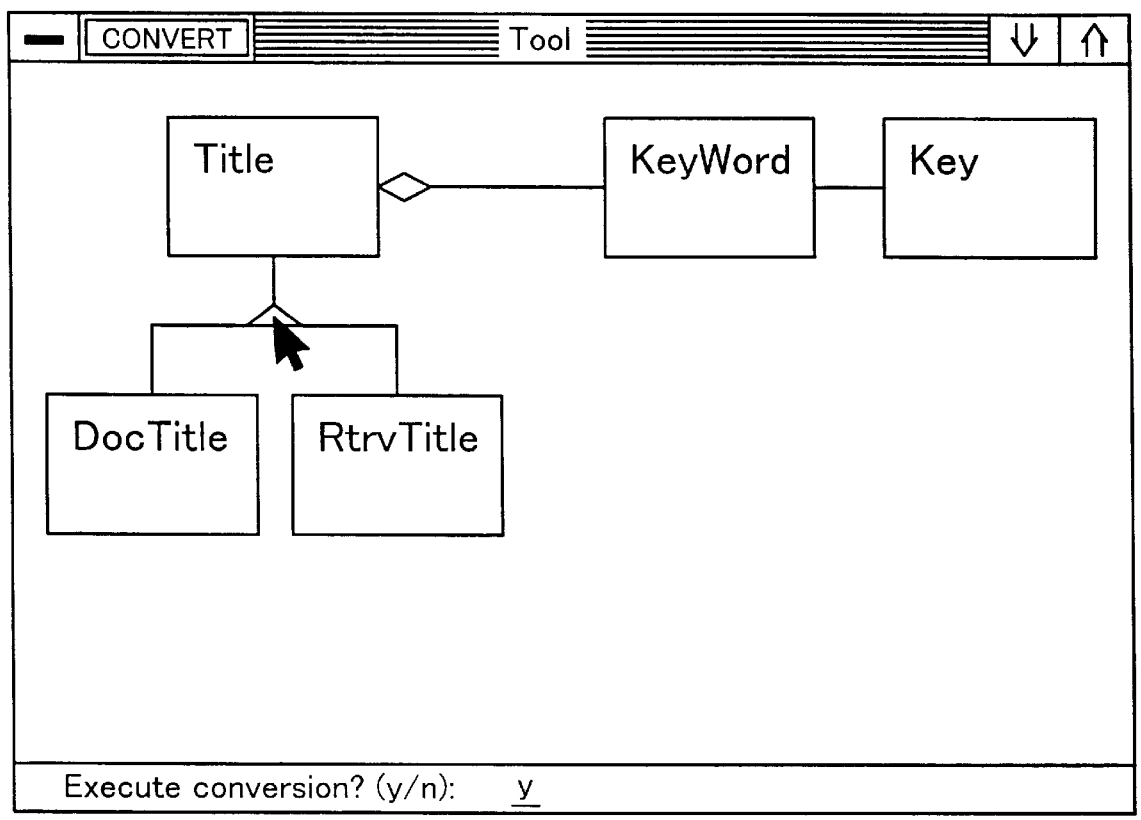
Figure 23:
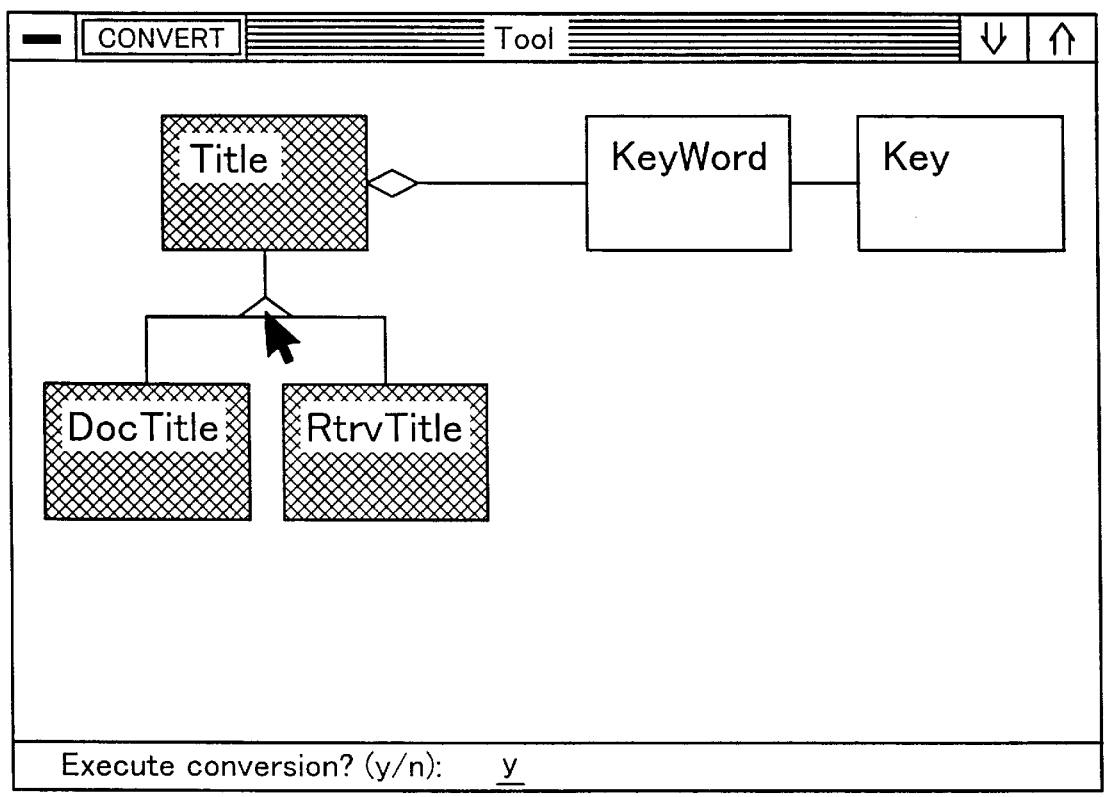

When the user selects "cancel aggregation/association" from the "Conversion Processing" menu (FIG. 21), the user can specify the inheritance which is the path of equivalent conversion or distribution (step 191, FIG. 22). In this state, when the user clicks on the symbol representing inheritance (FIG. 22), the inheritance relation is selected, all the classes associated with the inheritance relation are identified based on the relation data, and then the boxes of those classes are displayed in reverse video (FIG. 23).

When the user starts operation, for example, by keying (FIG. 23), the selected class is distributed. That is, all the selected child classes (step 192) are sequentially identified (step 193) based on the relation data (step 194), the class type and the class information of the selected class are copied to all the identified child class (step 195) as those class information, and then the copied data is deleted from the parent class (step 196).

Figure 24:
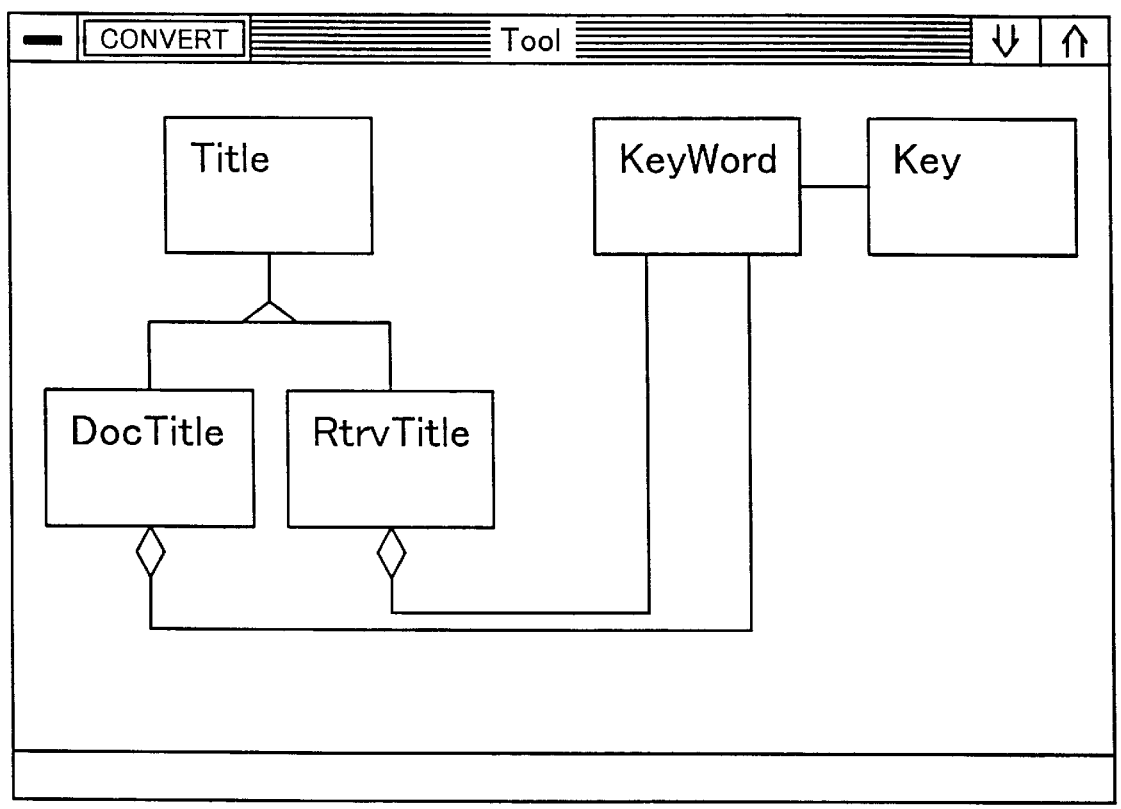

After that, the diagram is drawn again based on the data updated as a result of distribution (step 197, FIG. 24). When the diagram is drawn again, the selected class is directly connected to the child classes having the inheritance relation, with the use of lines and symbols representing the relation, and the symbols connecting the parent class and selected class are deleted.

In FIG. 24, the aggregation relation between the parent class "Title" and the partial class "KeyWord" is canceled, and the class "KeyWord" is directly included in the classes "DocTitle" and "RtrvTitle".

Figure 25:
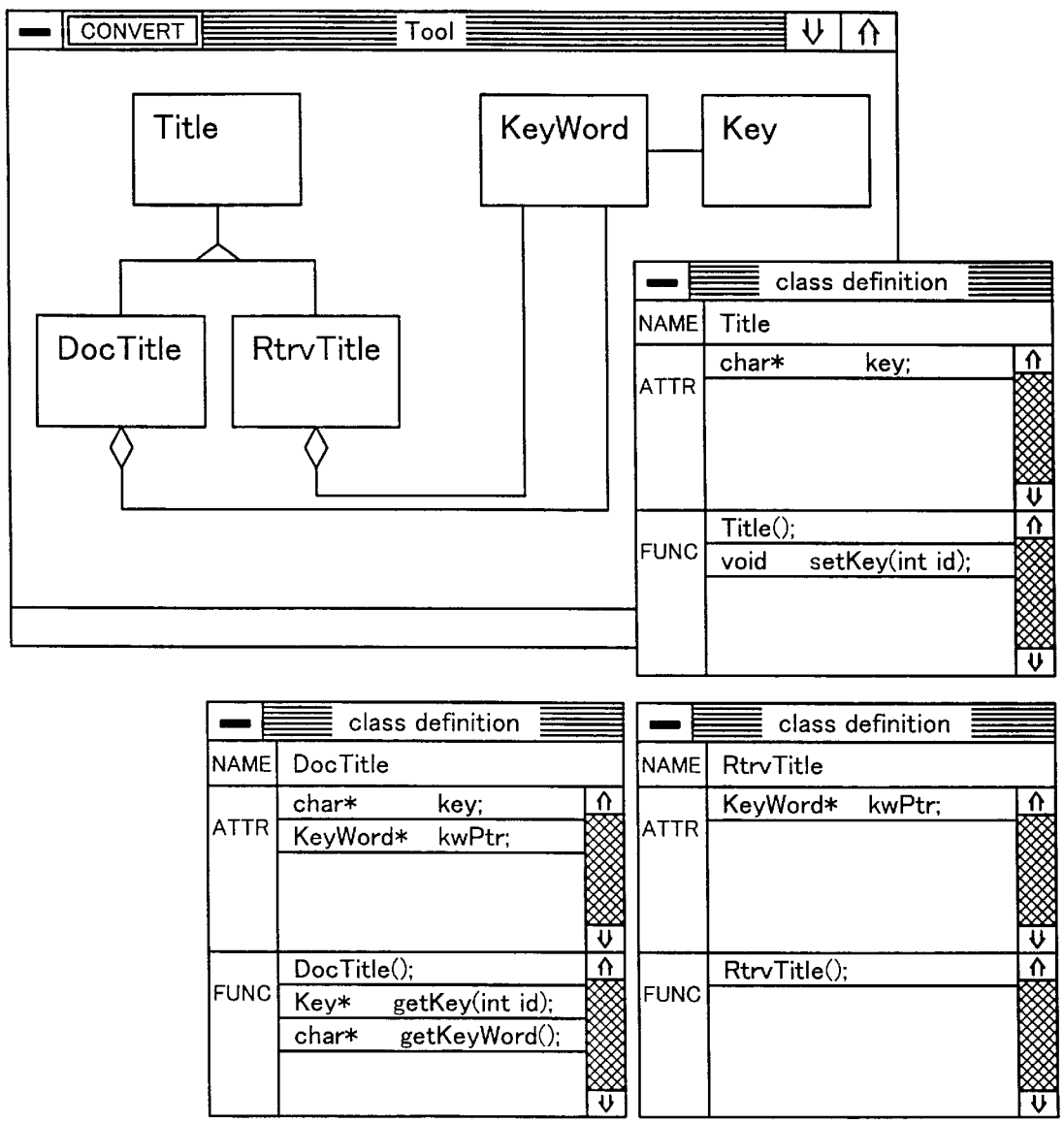

When the user clicks on the box of each class after cancellation, the class definition of the class are displayed so that the user can confirm the result of cancellation (FIG. 25).

3–3 Inheritance relation cancellation

Figure 26:
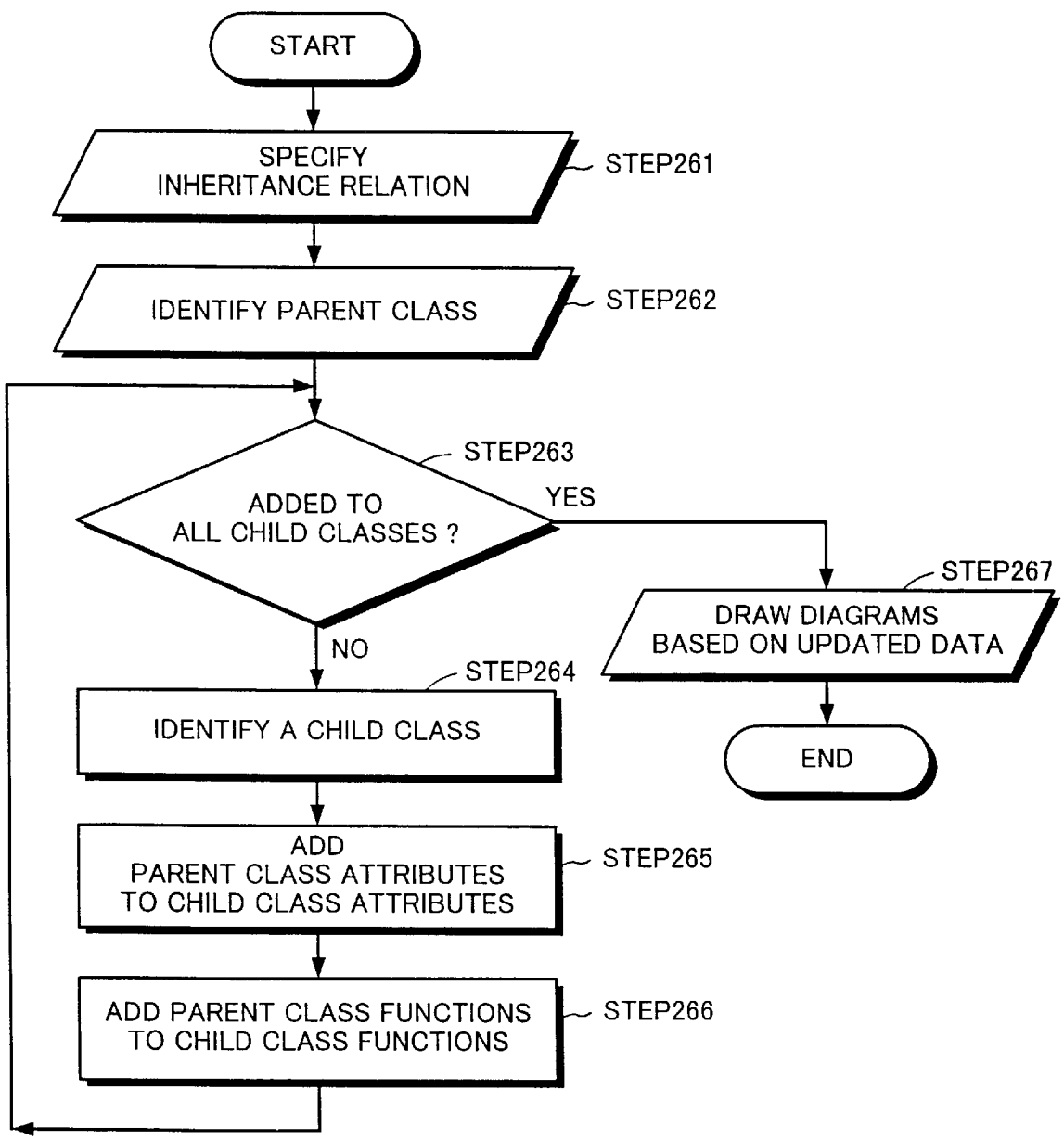
FIG. 26 is a flowchart illustrating the inheritance cancellation procedure used in an embodiment of present invention.
Figure 27:
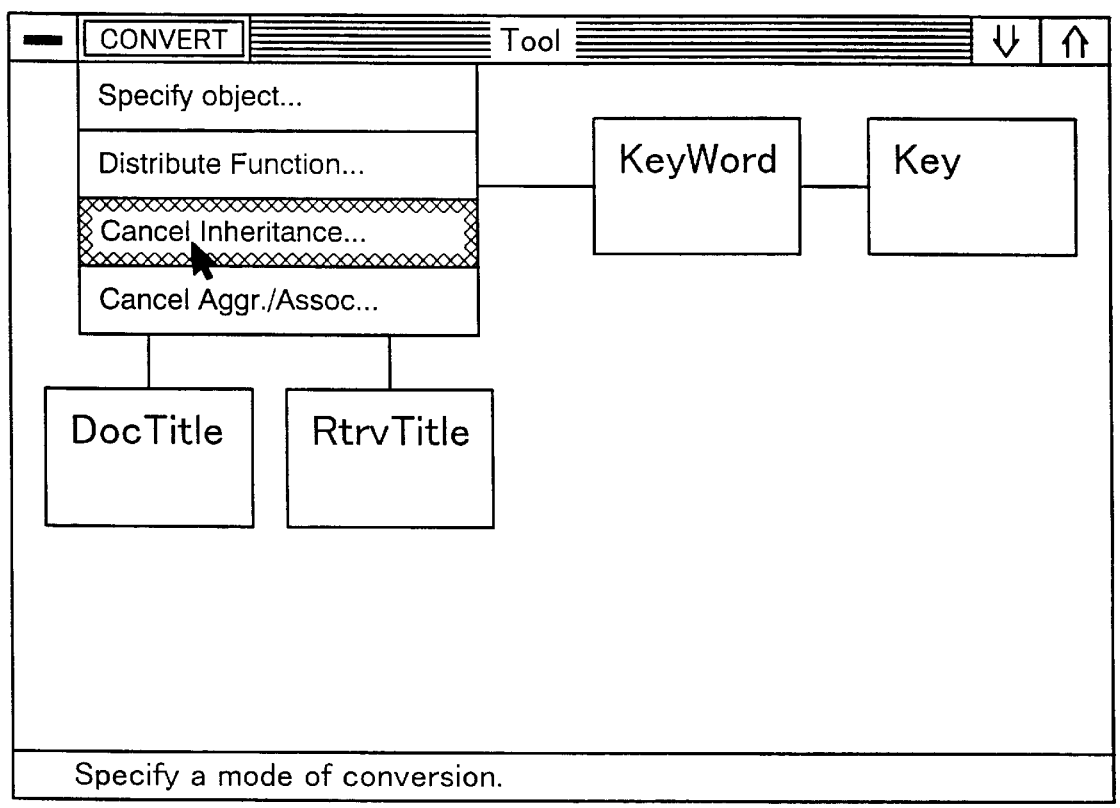

FIG. 26 is a flowchart illustrating the procedure for "inheritance relation cancellation", which is another conversion mode. In this procedure, when the user selects "Cancel Inheritance Relation" (FIG. 27) from the "Conversion Processing" menu, the user can select an inheritance relation on which equivalent conversion, or cancellation, is to be performed (step 281). In this state, when the user clicks on the symbol indicating inheritance, the inheritance relation is selected and the boxes of the classes associated with that inheritance relation are displayed in reverse video (FIG. 23). In FIG. 23, the class "Title" is selected as the parent class, and the classes "DocTitle" and "RtrvTitle" are selected as child classes.

When the user starts operation, for example, by keying (FIG. 23), the selected inheritance relation is canceled. That is, the parent class of the inheritance relation is identified first based on the relation data (step 262), all the child classes (step 263) having the inheritance relation with this parent are sequentially identified (step 264), each attribute of the parent class is copied to the identified child classes (step 265), each function of the parent class is copied to the identified child classes (step 266).

Figure 28:
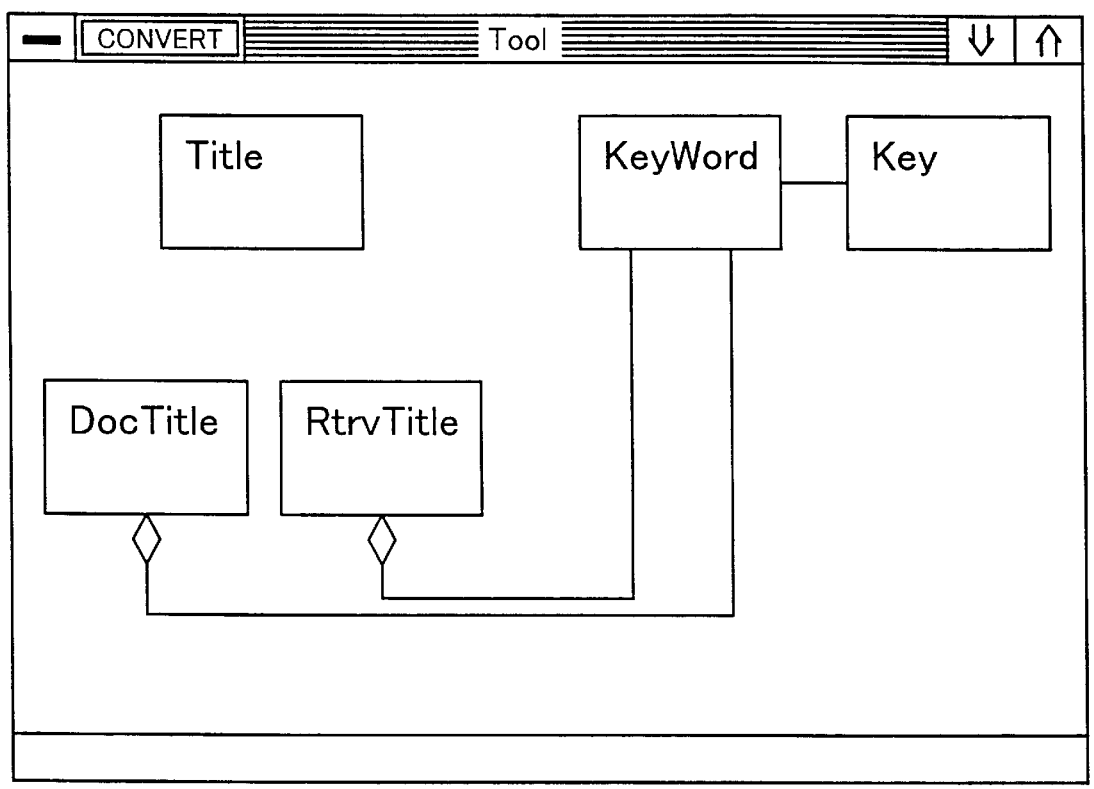
Figure 29:
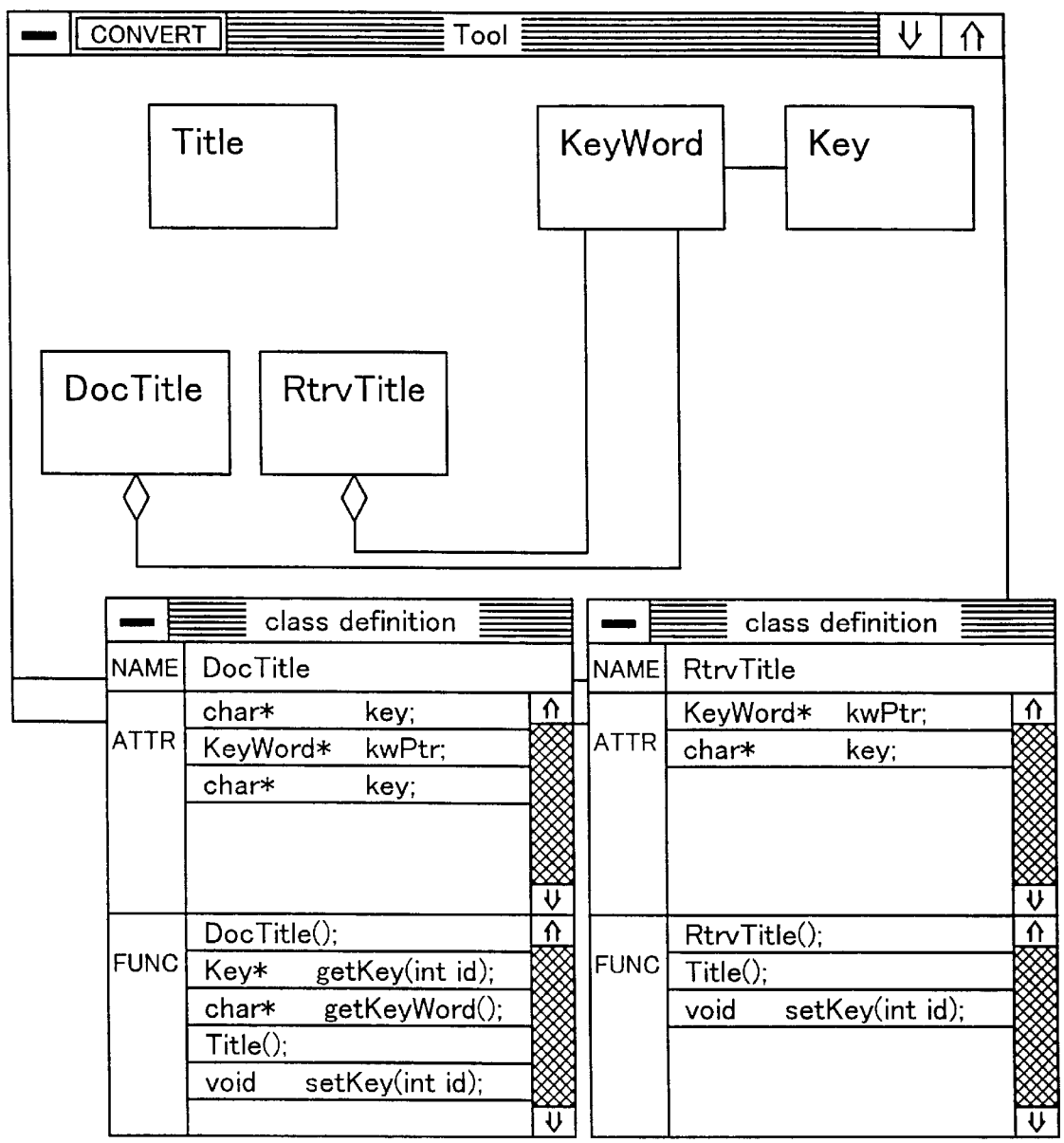

After that, the diagram is drawn again based on the data updated as a result of cancellation (step 267, FIG. 28). When the diagram is drawn, each class connected to the class that was the parent class of the inheritance relation is connected to each class that was a child class of the inheritance relation with the use of lines and symbols representing the relation, and the symbols representing the canceled inheritance relation are deleted.

4. Effect of the Embodiment

According to this embodiment, by entering a conversion range and a mods, the equivalent conversion of a class network structure represented by class data and relation data is automatically performed by the equivalent conversion section 10. This equivalent conversion means the automatic equivalent conversion of a class relation structure represented by program data, increasing the efficiency and reliability of program development.

In addition, the generation section 11 generates diagram format display data on the display unit 2, making it easy to understand the class data and relation data before and after conversion.

This embodiment allows the user to enter the output range of a diagram and the output format of the diagram, enabling him to generate a diagram that meets his needs. In particular, this embodiment does not use source code itself as program data representing the contents of the program; instead, it uses class data representing the partial contents of each class as well as relation data representing each class relation. In addition, class data and relation data may not be specific. Thus, even when the program contents are not yet determined specifically, for example, in the program design stage, equivalent conversion may be performed using class network structure data determined at that stage in the same manner as for a completed program.

5. Other embodiment

The present invention is not restricted to the embodiment described above. Because the embodiment may be modified, other embodiments described below will also be included. For example, although class data and relation data are used as the program data in the above embodiment, the source code of the completed program may be used as the program data. In addition, class data and relation data kept in this system in advance may be used in the above embodiment.

The contents of the syntax of an object-oriented programming language, class relations, equivalent conversion modes, and display formats are not restricted to those used in the embodiment.

More specifically, a concise program which can be viewed at a glance may be implemented by generating a higher-level abstraction class containing the attributes and operations common to other classes and by performing equivalent conversion so that lower-level classes can inherit them. In addition, the need for the manual modification of a program after equivalent conversion is minimized by allowing a change in one class relation to automatically affect multistage class relations associated with that relation.

If the user is allowed to determine the specific contents of equivalent conversion and to enter them, he can implement a system that suits his need.

Program data may be output without using diagrams. In addition, when processing source code itself as program data, the program text itself may be displayed or the class network relation of the program may be displayed.

So far, a relation among classes is called a class network structure, but a network structure may also be used for a class relation.

INDUSTRIAL APPLICABILITY

The present invention provides the user with an object-oriented programming system that performs the equivalent conversion of a class network structure, thus increasing the efficiency and reliability of software development.

What is claimed is:

1. An object-oriented programming system using original program data representing a program having an original class network structure including plural original classes; the system comprising:

a conversion range input means for receiving a conversion range for said original class network structure of said program;

a conversion mode input means for receiving a conversion mode; and an equivalent conversion means for performing an equivalent conversion on said original program data based on said conversion range and said conversion mode to create modified program data including an equivalent modified class network structure including plural equivalent classes, wherein said equivalent conversion comprises at least a conversion of a parent class in inheritance relation.

2. An object-oriented programming system as claimed in claim 1, wherein said original program data comprises:

class data representing said plural original classes in said original class network structure; and relation data representing relationships between said plural original classes in said original class network structure.

3. An object-oriented programming system as claimed in claim 2, wherein said relation data comprises two-way links between first and second of said plural original classes.

4. An object-oriented programming system as claimed in claim 1, wherein said conversion range input means comprises means for selecting said conversion range from at least one of said class data and said relation data.

5. An object-oriented programming system using original program data representing a program having an original class network structure including plural original classes, the system comprising:

a conversion range input means for receiving a conversion range for said original class network structure of said program;

a conversion mode input means for receiving a conversion mode; and an equivalent conversion means for performing an equivalent conversion on said original program data based on said conversion range and said conversion mode to create modified program data including an equivalent modified class network structure including plural equivalent classes, wherein said conversion mode comprises at least one of operation distribution, inheritance relation cancellation, and aggregation/association cancellation.

6. An object-oriented programming system as claimed in claim 1, wherein said equivalent conversion means uses said conversion mode and integrates first and second original classes of said plural original classes by generating a higher-level abstraction class containing attributes and operations common to said first and second original classes by causing corresponding first and second equivalent classes of said plural equivalent classes to inherit the common attributes and operations.

7. An object-oriented programming system as claimed in claim 1, wherein said equivalent conversion of a class relation into plural class relations is based on the class relation.

8. An object-oriented programming system as claimed in claim 1, further comprising a definition means for defining specific contents of said equivalent conversion.

9. An object-oriented programming system as claimed in claim 1, further comprising:
   a data output means for outputting said original program data; and
   an output format input means for receiving an output format of said original program data.

10. An object-oriented programming system as claimed in claim 9, wherein said output format comprises a diagram.

11. An object-oriented programming system as claimed in claim 9,
   wherein said original program data comprises class data representing said plural original classes in said original class network structure and relation data representing relationships between said plural original classes in said original class network structure; and
   wherein said output format includes at least a class data display.

12. An object-oriented programming system as claimed in claim 10, wherein said data output means comprises means for using a specific frame for a corresponding one of said plural original classes and for using a different shape for each class relation depending upon a corresponding type of relation in outputting said diagram.

13. An object-oriented programming system as claimed in claim 12,
   wherein said original program data comprises class data representing said plural original classes in said original class network structure and relation data representing relationships between said plural original classes in said original class network structure; and
   wherein at least one of said class data and said relation data includes position data indicating a display position of at least one of said specific frame and said different shape.

14. An object-oriented programming system as claimed in claim 12,
   wherein said data output means displays said diagram on at least one of plural windows on a multi-window screen;
   wherein said original program data comprises class data representing said plural original classes in said original class network structure and relation data representing relationships between said plural original classes in said original class network structure and
   further comprising means for displaying said class data of one of the plural original classes in a new sub-window corresponding to the one of the plural original classes when an operation is performed on said specific frame corresponding to the one of the plural classes by using a pointing device.

15. An object-oriented programming system as claimed in claim 1, comprising:
   a data output means for outputting said original program data; and
   an output range input means for receiving a program data output range.

16. An object-oriented programming system using program data representing a program having a class network structure including plural classes, said plural classes including a parent class and a child class having a class inheritance relation, the system comprising:
   a conversion range input means for receiving a conversion range for said class network structure of said program; and
   an equivalent conversion means for performing an equivalent conversion on said program data based on said conversion range, wherein said equivalent conversion means performs operation distribution by copying operations of the parent class into the child class and by deleting the copied operations from the parent class.

17. An object-oriented programming system as claimed in claim 16, wherein said conversion range input means selects said operations to be distributed on an operation basis.

18. An object-oriented programming system using program data representing a program having a class network structure including plural classes, said plural classes including a parent class and a child class having a class inheritance relation, the system comprising:
   a conversion range input means for a conversion range of said class network structure of said program; and
   an equivalent conversion means for performing an equivalent conversion on said program data based on said conversion range, wherein said equivalent conversion means performs inheritance relation cancellation by copying all attributes and operations of the parent class into the child class and by deleting the class inheritance relation between the parent class and the child class.

19. An object-oriented programming system using program data representing a program having a class network structure including plural classes, said plural classes including a parent class and a child class having a class inheritance relation, the system comprising:
   a conversion range input means for a conversion range of said class network structure of said program; and
   an equivalent conversion means for performing an equivalent conversion on said program data based on said conversion range, wherein said equivalent conversion means converts at least one of an aggregation relationship and an association relationship between a third class and the parent class to a relationship between the third class and the child class.

20. An object-oriented programming method using program data representing a program having a class network structure including plural classes, comprising the steps of:

accepting a conversion range for said class network structure of said program;

accepting a conversion mode; and performing an equivalent conversion on said program data based on said conversion range and said conversion mode.

21. An object-oriented programming system using program data representing a program having a class network structure including plural classes, said plural classes including a parent class and a child class having a class inheritance relation, the system comprising:

a conversion range input means for a conversion range of said class network structure of said program; and a conversion mode input means for receiving a conversion mode; and an equivalent conversion means for performing an equivalent conversion on said program data based on said conversion range and said conversion mode, wherein data is input and output on a display screen by an interactive method.

* * * * *